(12) United States Patent
Elford

(10) Patent No.: US 11,586,173 B2
(45) Date of Patent: Feb. 21, 2023

(54) OFFSET SURFACE TRANSFORMATIONS FOR GENERATING CNC TOOLPATHS

(71) Applicant: The Boeing Company, Chicago, IL (US)

(72) Inventor: Michael Charles Elford, Springfield (AU)

(73) Assignee: THE BOEING COMPANY, Arlington, VA (US)

(*) Notice: Subject to any disclaimer, the term of this patent is extended or adjusted under 35 U.S.C. 154(b) by 0 days.

(21) Appl. No.: 17/453,638

(22) Filed: Nov. 4, 2021

(65) Prior Publication Data

US 2022/0179396 A1 Jun. 9, 2022

Related U.S. Application Data

(60) Provisional application No. 63/122,377, filed on Dec. 7, 2020.

(51) Int. Cl.
*G05B 19/41* (2006.01)
*G05B 19/4093* (2006.01)

(52) U.S. Cl.
CPC ....... *G05B 19/41* (2013.01); *G05B 19/40932* (2013.01); *G05B 2219/35134* (2013.01); *G05B 2219/35167* (2013.01)

(58) Field of Classification Search
None
See application file for complete search history.

(56) References Cited

U.S. PATENT DOCUMENTS 10,775,771 B1 * 9/2020 Elford ................... G01B 21/20

OTHER PUBLICATIONS

Araghi, B. et al., "Review on the development of a hybrid incremental sheet forming system for small batch sizes and individualized production," Production Engineering, vol. 5, No. 4, May 12, 2011, 13 pages.

* cited by examiner

*Primary Examiner* — Ryan A Jarrett
(74) *Attorney, Agent, or Firm* — Alleman Hall Creasman & Tuttle LLP

(57) ABSTRACT

A method for CNC manufacturing is provided. The method includes computer-reading a digital model of a 3D part within a first topological space. An offset surface for the digital model in the first topological space is computer-generated. The offset surface in the first topological space is computer-transformed to a transformed offset surface in a second topological space embedded in the first topological space. A plurality of contours are computer-identified, at which a corresponding plurality of embedded parallel planes intersect the transformed offset surface in the second topological space. The plurality of contours in the second topological space are computer-transformed into a corresponding plurality of transformed contours in the first topological space. A CNC toolpath is computer-generated that traces each of the plurality of transformed contours in the first topological space, the CNC toolpath useable by a CNC machine to manufacture the 3D part.

20 Claims, 17 Drawing Sheets

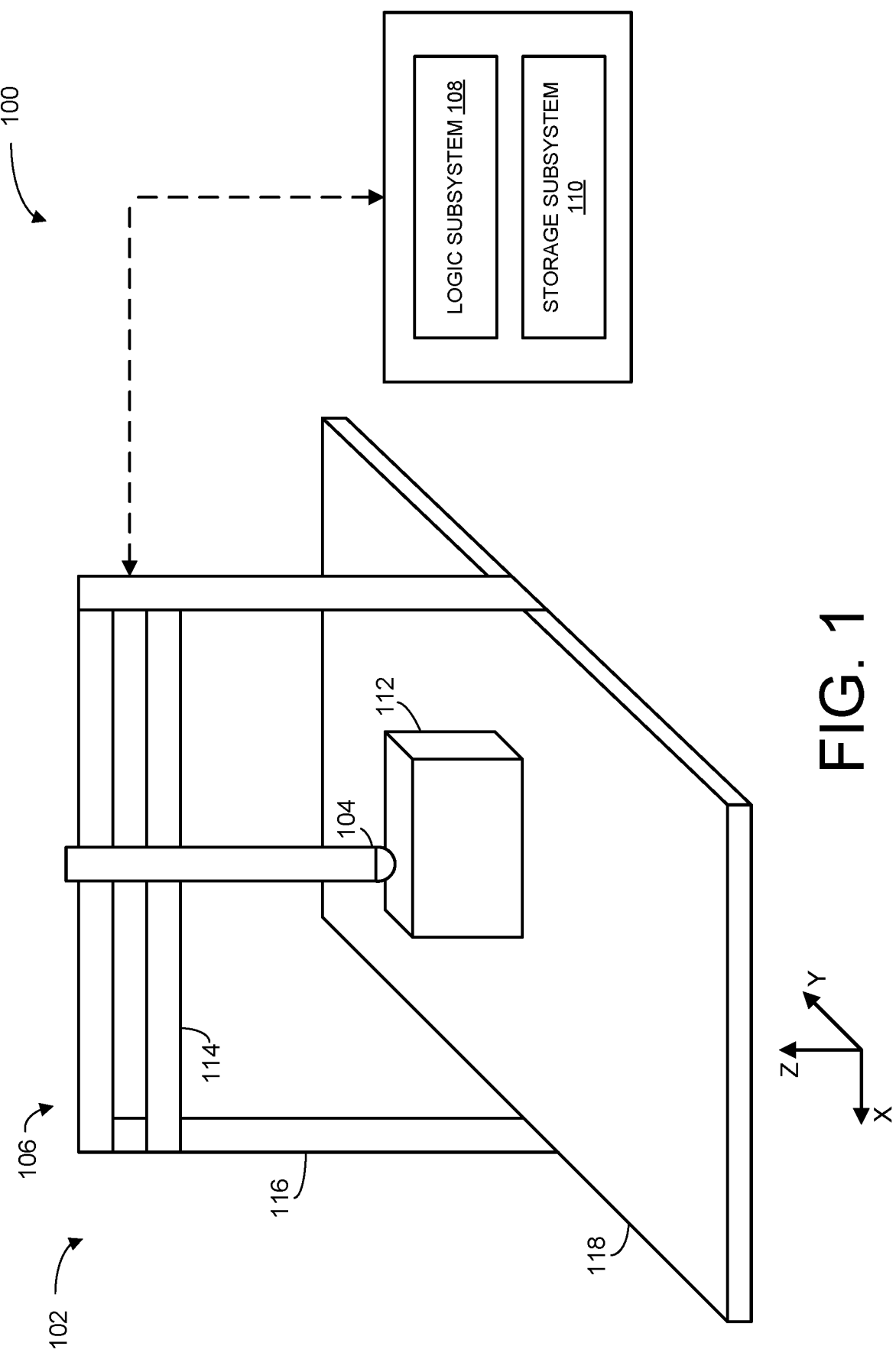

200 ↴

```
┌─────────────────────────────────────────────────────────┐
│ COMPUTER-READ A DIGITAL MODEL OF A 3D PART WITHIN A     │
│ FIRST TOPOLOGICAL SPACE                             202 │
└─────────────────────────────────────────────────────────┘
                            ↓
┌─────────────────────────────────────────────────────────┐
│ COMPUTER-GENERATE AN OFFSET SURFACE FOR THE DIGITAL     │
│ MODEL IN THE FIRST TOPOLOGICAL SPACE                204 │
└─────────────────────────────────────────────────────────┘
                            ↓
┌─────────────────────────────────────────────────────────┐
│ COMPUTER-TRANSFORM THE OFFSET SURFACE IN THE FIRST      │
│ TOPOLOGICAL SPACE TO A TRANSFORMED OFFSET SURFACE IN A  │
│ SECOND TOPOLOGICAL SPACE EMBEDDED IN THE FIRST          │
│ TOPOLOGICAL SPACE                                   206 │
└─────────────────────────────────────────────────────────┘
                            ↓
┌─────────────────────────────────────────────────────────┐
│ COMPUTER-IDENTIFY A PLURALITY OF CONTOURS AT WHICH A    │
│ CORRESPONDING PLURALITY OF EMBEDDED PARALLEL PLANES     │
│ INTERSECT THE TRANSFORMED OFFSET SURFACE IN THE SECOND  │
│ TOPOLOGICAL SPACE                                   208 │
└─────────────────────────────────────────────────────────┘
                            ↓
┌─────────────────────────────────────────────────────────┐
│ COMPUTER-TRANSFORM THE PLURALITY OF CONTOURS IN THE     │
│ SECOND TOPOLOGICAL SPACE INTO A CORRESPONDING           │
│ PLURALITY OF TRANSFORMED CONTOURS IN THE FIRST          │
│ TOPOLOGICAL SPACE                                   210 │
└─────────────────────────────────────────────────────────┘
                            ↓
┌─────────────────────────────────────────────────────────┐
│ COMPUTER-GENERATE A CNC TOOLPATH THAT TRACES EACH OF    │
│ THE PLURALITY OF TRANSFORMED CONTOURS IN THE FIRST      │
│ TOPOLOGICAL SPACE                                   212 │
└─────────────────────────────────────────────────────────┘
                            ↓
┌─────────────────────────────────────────────────────────┐
│ MANUFACTURE THE 3D PART WITH A CNC TOOL OF A CNC MACHINE│
│                                                     214 │
└─────────────────────────────────────────────────────────┘
```

FIG. 2

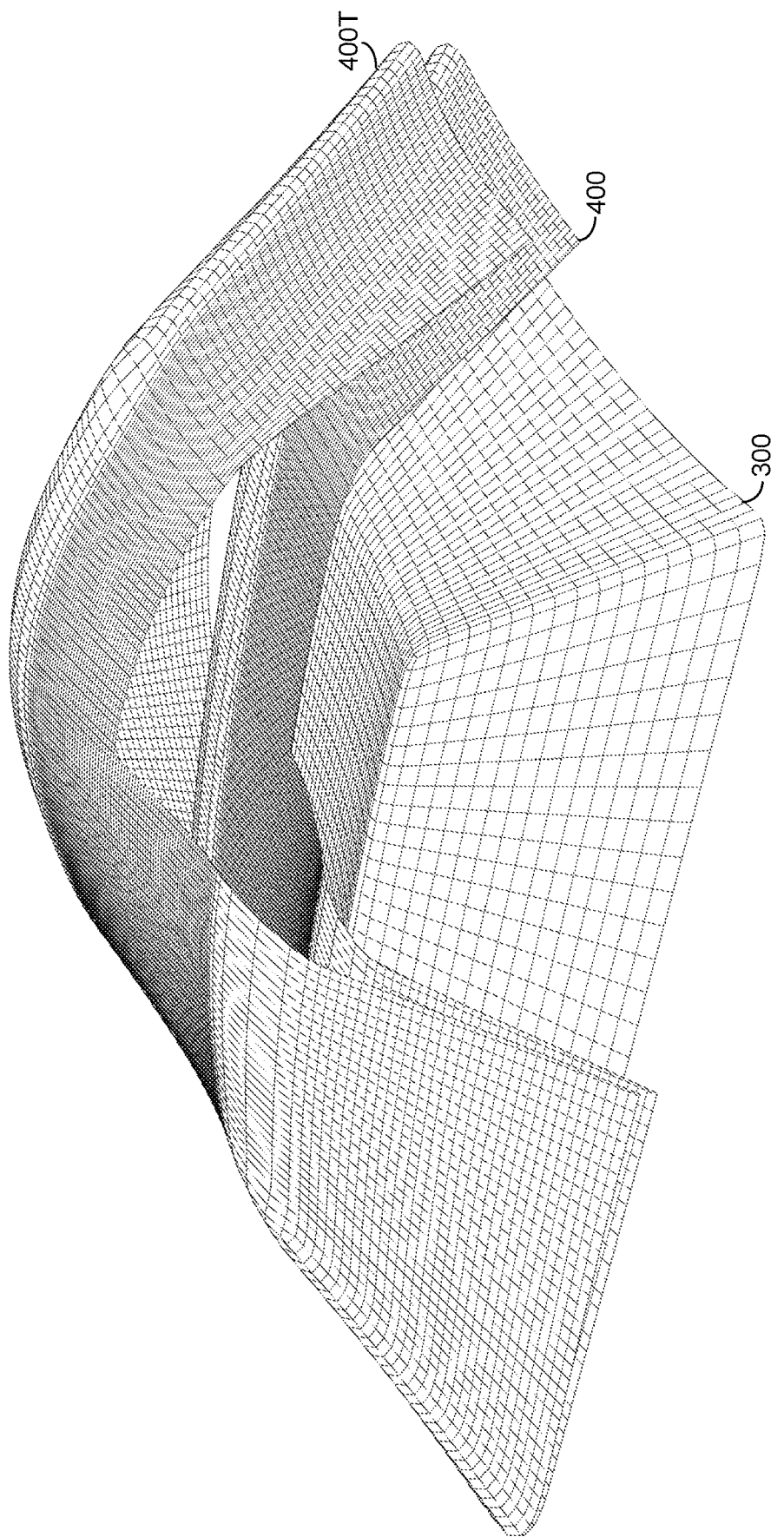

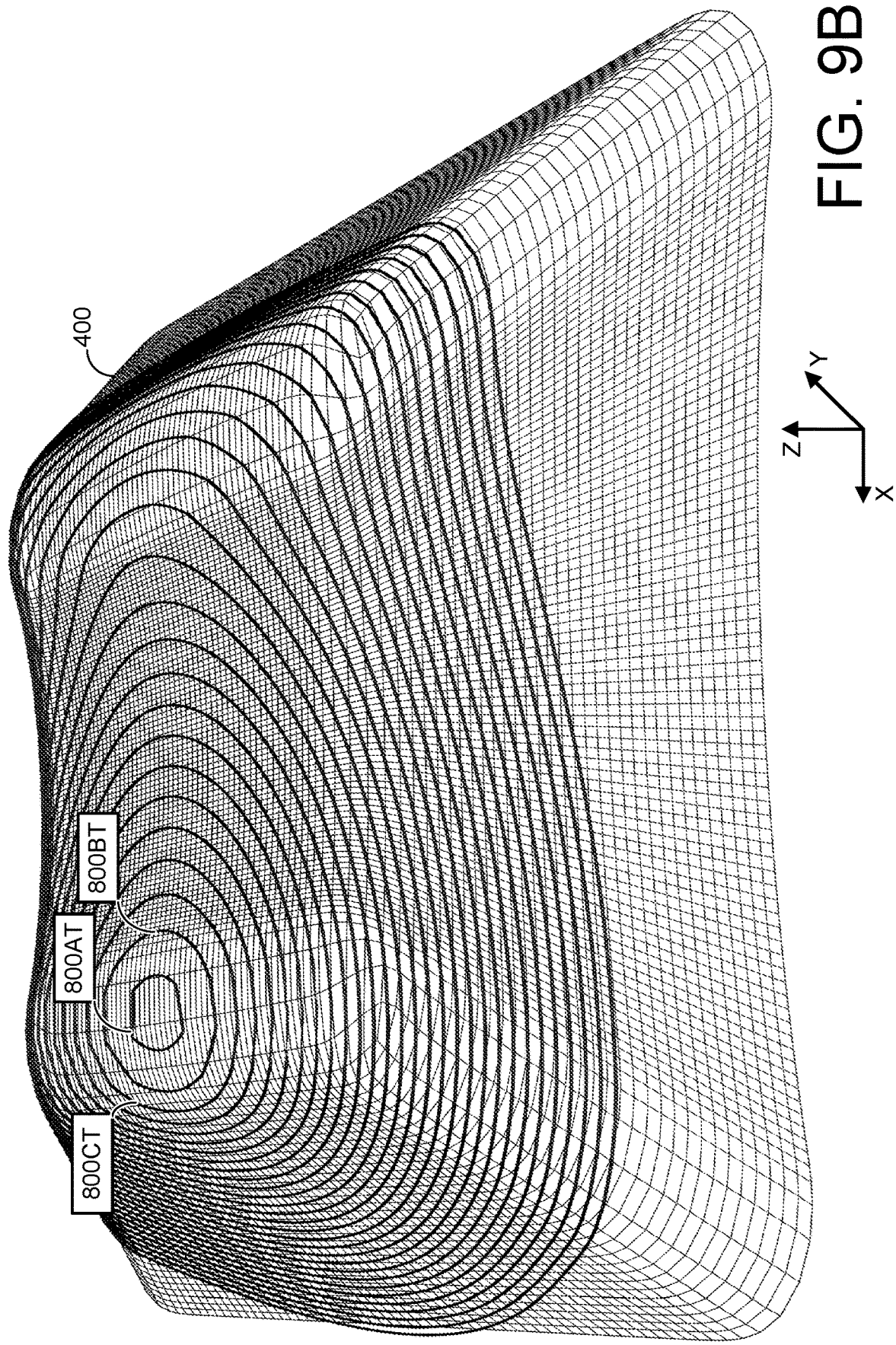

OFFSET SURFACE TRANSFORMATIONS FOR GENERATING CNC TOOLPATHS

CROSS REFERENCE TO RELATED APPLICATIONS

This application claims priority to U.S. Provisional Patent Application Ser. No. 63/122,377, filed Dec. 7, 2020, the entirety of which is hereby incorporated herein by reference for all purposes.

FIELD

The invention relates generally to computer numerical control (CNC) manufacturing, and more specifically, to generating CNC toolpaths.

BACKGROUND

CNC manufacturing encompasses a variety of techniques that facilitate production of three-dimensional parts, such as machine parts and consumer goods. Typically, CNC manufacturing involves a computerized system moving a CNC tool along a "toolpath." This can include additive manufacturing techniques, such as three-dimensional (3D) printing; subtractive manufacturing techniques in which the desired part is formed by "machining," or removing matter from, a starting material such as wood, plastic, or metal; and techniques in which the shape or appearance of the starting material (e.g., sheet metal) is changed without substantially adding or subtracting any matter, such as incremental sheet forming (ISF).

CNC toolpaths are typically generated via computer analysis of a virtual model of the 3D part to be manufactured. Based on information regarding the desired shape of the 3D part, the initial shape of the starting material, the shape of the CNC tool, and the capabilities of the CNC machine controlling the CNC tool, the computer is programmed to generate a set of movements for the CNC tool to follow that will result in the 3D part being generated from the starting material.

However, CNC toolpaths generated using conventional approaches can give suboptimal results for certain part geometries. In the specific example of ISF, CNC toolpaths generated using conventional methods can struggle to produce 3D parts of acceptable quality when such parts include flat surfaces or "saddle" shapes, among other problematic features. While conventional CNC toolpaths can still be useable to produce 3D parts including these features, the resulting parts can include defects, which can cause quality control issues and, in some cases, render the 3D parts unusable.

Thus, and in view of the above, challenges exist in generating CNC toolpaths useable to form certain types of 3D parts that are of suitable quality and substantially free from defects.

SUMMARY

This summary is not an extensive overview of the specification. It is intended to neither identify key or critical elements of the specification nor delineate any scope particular to embodiments of the specification, or any scope of the claims. Its sole purpose is to present some concepts of the specification in a simplified form as a prelude to the more detailed description that is presented in this disclosure.

To address at least the above issues, according to one aspect of the subject disclosure, a method for CNC manufacturing is provided. In this aspect, the method includes computer-reading a digital model of a 3D part within a first topological space. An offset surface for the digital model in the first topological space is computer-generated. The offset surface in the first topological space is computer-transformed to a transformed offset surface in a second topological space embedded in the first topological space. A plurality of contours are computer-identified, at which a corresponding plurality of embedded parallel planes intersect the transformed offset surface in the second topological space. The plurality of contours in the second topological space are computer-transformed into a corresponding plurality of transformed contours in the first topological space. A CNC toolpath is computer-generated that traces each of the plurality of transformed contours in the first topological space, the CNC toolpath useable by a CNC machine to manufacture the 3D part.

According to another aspect of the subject disclosure, a CNC tool control system comprises a CNC tool and a computer-controlled CNC tool movement assembly configured to manufacture a 3D part by moving the CNC tool along a CNC toolpath. The CNC tool control system further comprises a logic subsystem and a storage system holding instructions executable by the logic subsystem to read a digital model of the 3D part within a first topological space. An offset surface for the digital model is generated in the first topological space. The offset surface in the first topological space is transformed to a transformed offset surface in a second topological space embedded in the first topological space. A plurality of contours are identified, at which a corresponding plurality of embedded parallel planes intersect the transformed offset surface in the second topological space. The plurality of contours in the second topological space are transformed into a corresponding plurality of transformed contours in the first topological space. A CNC toolpath is generated that traces each of the plurality of transformed contours in the first topological space, the CNC toolpath useable by the CNC tool control system to manufacture the 3D part by controlling the computer-controlled CNC tool movement assembly to move the CNC tool along the CNC toolpath.

According to another aspect of the subject disclosure, a method for CNC manufacturing comprises computer-reading a digital model of a three-dimensional (3D) part within a Euclidean space. An offset surface for the digital model in the Euclidean space is computer-generated. The offset surface in the Euclidean space is computer-transformed to a transformed offset surface in a manifold space embedded in the Euclidean space. A plurality of contours are computer-identified at which a corresponding plurality of embedded Z-level planes intersect the transformed offset surface in the manifold space. The plurality of contours in the manifold space are computer-transformed into a corresponding plurality of transformed contours in the Euclidean space. A CNC toolpath is computer-generated that traces each of the plurality of transformed contours in the Euclidean space. A CNC tool is computer-controlled to follow the CNC toolpath and manufacture the 3D part.

The features, functions, and advantages that have been discussed can be achieved independently in various embodiments or can be combined in yet other embodiments, further details of which can be seen with reference to the following description and drawings.

BRIEF DESCRIPTION OF THE DRAWINGS

FIG. 1 shows a schematic representation of an example CNC tool control system.

FIG. 2 shows an example method for CNC manufacturing.

FIGS. 7A and 7B illustrate transformation of the offset surface of FIGS. 4A and 4B from a first topological space to a second topological space.

FIG. 9B shows a representation of the offset surface of FIG. 8, transformed back to the first topological space with a plurality of transformed contours.

DETAILED DESCRIPTION

Figure 3:
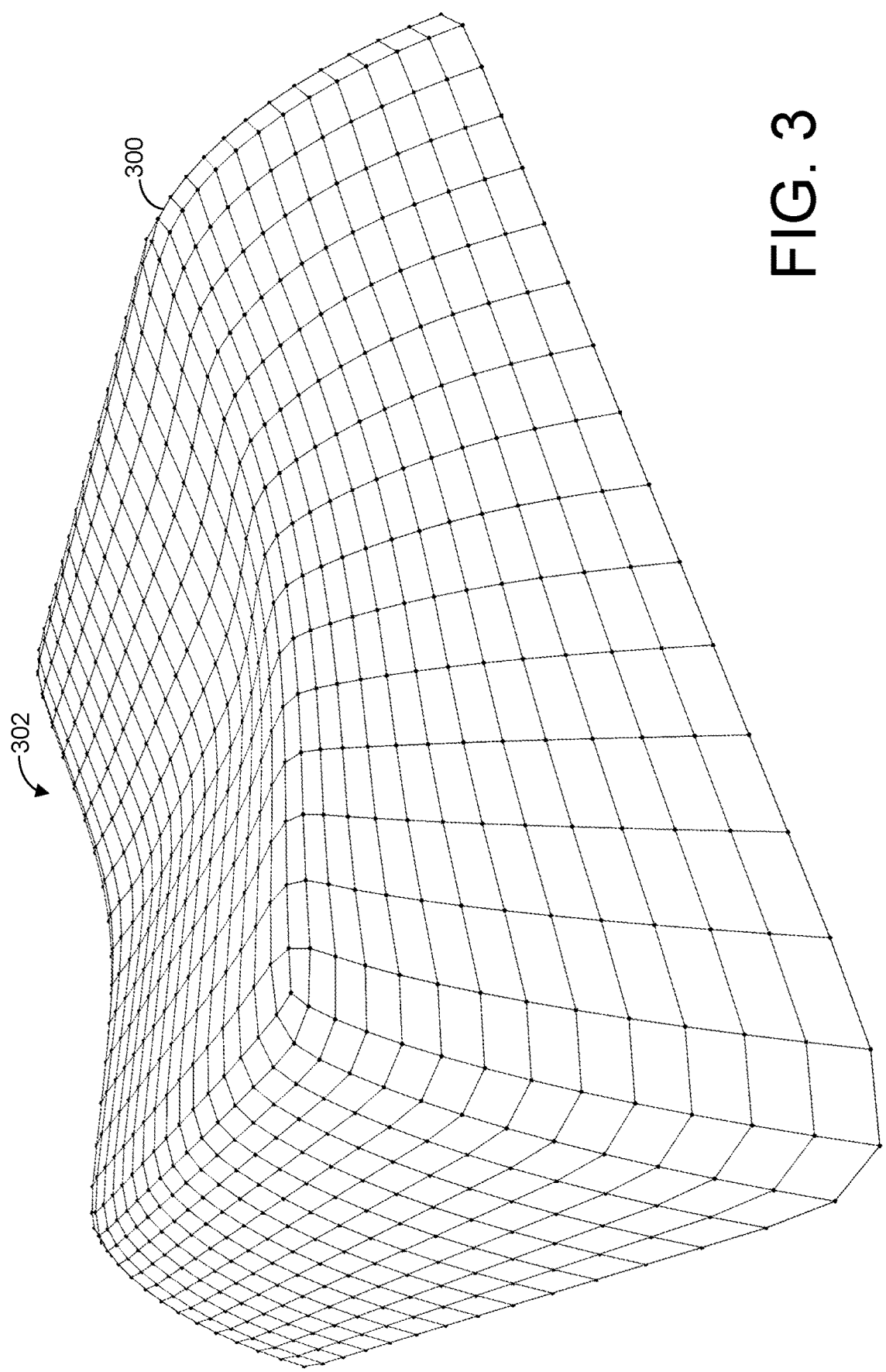
FIG. 3 shows a representation of a digital model of an example 3D part.

FIG. 1 shows a schematic representation of an example CNC tool control system 100. Control system 100 includes a CNC machine 102, which in turn includes a CNC tool 104 and a computer-controlled CNC tool movement assembly 106. The tool movement assembly enables movement of CNC tool 104 in three orthogonal directions—e.g., corresponding to the X, Y, and Z axes as depicted in FIG. 1—according to computer commands received from a logic subsystem 108. Such computer commands can be generated based on execution of computer instructions stored by a storage subsystem 110.

The logic subsystem 108 and storage subsystem 110 can be components of a computing system of one or more computing devices. Such a computing system can be integrated within, or external to but communicatively coupled with, the CNC machine 102. The computing system can have any suitable hardware configuration and form factor and can be implemented as computing system 1100 described below with respect to FIG. 11.

By carrying out the computer commands received from the logic subsystem, tool movement assembly 106 causes CNC tool 104 to follow a previously generated CNC toolpath. In other words, the tool movement assembly causes the CNC tool to follow a series of pre-programmed movements relative to the X, Y, and Z axes, aimed at manufacturing a 3D part from a starting material 112. For the sake of simplicity, starting material 112 is depicted in FIG. 1 as a rectangular cuboid, although this is not limiting. Rather, given the wide variety of manufacturing processes to which CNC techniques can be applied, it will be understood that the starting material can take any variety of suitable forms and be comprised of any variety of suitable materials.

For the purposes of the subject disclosure, "manufacturing" includes any process in which a CNC tool is used to alter the shape, appearance, and/or physical properties of a starting material. This can include additive manufacturing, such as 3D printing, or applying a coating such as paint; subtractive manufacturing, such as machining, polishing, sanding, cutting, grinding, lathing, or any other process in which matter is removed from a starting material; and/or processes where the shape or appearance of the starting material is altered without adding or removing substantial amounts of matter (e.g., bending, molding, ISF).

In the non-limiting and simplified example of FIG. 1, the tool movement assembly comprises two horizontal support rails 114 and two vertical support pillars 116. CNC tool 104 is moveably affixed to the horizontal support rails 114, enabling translation of the CNC tool in a direction parallel to the X axis. Similarly, the vertical support pillars are moveably affixed to a CNC machine base 118, enabling translation of the vertical support pillars, and thus the CNC tool, in a direction parallel to the Y axis. Translation of the CNC tool in a direction parallel to the Z axis can be achieved by moving the CNC tool relative to the horizontal support rails and/or by moving the horizontal support rails relative to the vertical support pillars. In some implementations, the base 118 can be moveable relative to other components of the CNC machine—e.g., to raise or lower the starting material relative to the Z axis, and/or translate the starting material relative to the X and/or Y axes.

However, it will be understood that the specific CNC tool control system depicted in FIG. 1 is a non-limiting example and is highly simplified for the sake of illustration. In particular, the computer-controlled CNC tool movement assembly need not include horizontal support rails and vertical support pillars as described above, but rather can take any number of suitable forms. As another example, the computer-controlled CNC tool movement assembly can take the form of a robotic arm including one or more articulating joints that enable movement of a CNC tool attached to one end of the robotic arm.

In general, the computer-controlled CNC tool movement assembly can include any structures suitable for moving a CNC tool with at least three degrees-of-freedom—e.g., corresponding to three orthogonal axes. The computer-controlled CNC tool movement assembly can in some cases move the CNC tool with more than three degrees-of-freedom. For example, in some implementations, the tool movement assembly can use 5-axis CNC technology to translate the CNC tool relative to the three orthogonal axes and rotate the CNC tool about two rotational axes. In some implementations, the tool movement assembly can move the CNC tool with six degrees-of-freedom, corresponding to three orthogonal axes as well as pitch, roll, and yaw.

In FIG. 1, CNC tool 104 is depicted as having a hemispherical tool tip, but it will be understood that this is non-limiting. Rather, the CNC tool can take any variety of suitable forms (e.g., end effectors) depending on the specific type of CNC manufacturing in question. For example, in the case of additive manufacturing, the CNC tool can have a tip suitable for depositing starting material—e.g., a liquid or powder-based starting material—to incrementally form the 3D part, such as in the process of Supersonic Particle Deposition. In other implementations related to additive manufacturing, the CNC tool can have a tip that holds a laser or electron beam emitting device, for the purposes of melting metal wire or powder. Examples of such processes include, but are not limited to, wire arc additive manufacturing, electron beam melting, electron beam free form fabrication, selective laser sintering, and selective laser melting. In the case of subtractive manufacturing, the CNC tool can have a tip suitable for removing matter from a starting material—e.g., the tool can have a rotating spindle with sharp cutting teeth, or an abrasive surface for grinding. In the case of manufacturing techniques that do not substantially add or remove matter, the CNC tool can include a flat or rounded surface, or another suitable surface, for manipulating the starting material to form a desired 3D shape. Such processes include, but are not limited to, Single Point Incremental Forming, Two Point Incremental Forming, and Dual Sided Incremental Forming. Other examples of CNC tools are those used for shot peening, spray painting, polishing, or measurement taking.

In any case, and regardless of the particular configuration used, the computer-controlled CNC tool movement assembly moves the CNC tool along a predetermined CNC toolpath to manufacture a 3D part. The CNC toolpath can be generated based on a computer analysis of a digital model of the 3D part, the initial shape of the starting material, the capabilities of the computer-controlled CNC tool movement assembly, and the shape of the CNC tool itself. In the specific example of ISF, in which a sheet metal blank starting material is formed into a desired shape, a "Z-level" type toolpath can be calculated by generating a digital "offset surface" for the 3D part. The offset surface defines a set of 3D points that, when coincident with a reference point on the CNC tool, correspond to contact between a tool surface and the 3D part at a specified tooling depth—e.g., to plastically deform the sheet metal blank in a desired manner. The digital offset surface is then virtually intersected with a plurality of parallel planes in the embedding space, or "Z-planes" that are orthogonal to the Z axis, to give a plurality of contours at the intersections between the planes and the offset surface. Here a contour can be one or more closed or open curves resulting from the intersection between the plane and the offset surface. A CNC toolpath is generated that causes the CNC tool to move along the contours in a top-down manner, starting with the highest contour relative to the Z-axis, then sequentially moving to the next-highest contour, until each contour has been traced. In this manner, when following the CNC toolpath, the CNC tool traces each plane/offset intersection in sequence to gradually form the starting material into the desired shape of the 3D part.

However, as discussed above, conventional Z-level type toolpaths can give unsatisfactory results for certain part geometries. In the specific example of ISF, using conventional Z-level type toolpaths to manufacture 3D parts having flat surfaces or "saddle" shaped features can result in 3D parts having defects, wrinkles, visual blemishes, or other quality control issues that can potentially render the 3D parts less desirable. In particular, a conventional Z-level toolpath generated for a 3D part having a saddle shape will typically cause the CNC tool to start at the two "peaks" of the saddle, given that the peaks are intersected by the highest Z-level plane, and thus will correspond to the highest contour in the sequence. From there, as the CNC tool traces lower and lower contours in the sequence, it will gradually converge toward the "trough" of the saddle. This has been observed to cause wrinkling in the sheet metal starting material in the vicinity of the trough, leading to quality control issues that can render the 3D part unusable. Similar issues can arise for 3D parts having other shapes, as well as other types of CNC manufacturing besides ISF.

Accordingly, the subject disclosure is directed to techniques for generating CNC toolpaths based on transformed offset surfaces. Conventional offset surfaces are generated and analyzed in three-dimensional Euclidean space—i.e., an affine space having an origin and three orthogonal axes that each extend into infinity as straight lines. According to the subject disclosure, after an offset surface for a 3D part is first generated in a first topological space (e.g., a Euclidean space), the offset surface can be transformed into a second three-dimensional topological space embedded within, and having different properties from, the first topological space. Such a transformation can be referred to as "pushing forward" the offset surface from the first topological space to the second topological space. The second topological space can be a manifold space—i.e., a topological space that is locally homeomorphic to Euclidean space but includes global non-Euclidean properties. As examples, the second topological space can be a three-dimensional hyperbolic, elliptic, parabolic, or gaussian graph-type manifold space, having three axes that can curve as they approach infinity.

Transforming an offset surface in such a manner can be done to advantageously affect the eventual Z-level toolpath generated for the 3D part. Specifically, the transformed offset surface can be intersected with a plurality of Z-level planes in the embedding space while still in the second topological space, resulting in a different set of contours than would be generated in the first topological space. In another implementation, the inverse mapping could be applied to a plurality of Z-level planes, and subsequently used to intersect the part in a Euclidean space. The plurality of contours can then be transformed, or "pulled back," to the first topological space, resulting in a plurality of transformed contours that still lie on the offset surface. Thus, a CNC toolpath can be generated that traces the transformed plurality of contours, resulting in a different toolpath than would have been generated if the offset surface had never been transformed into the second topological space.

Notably, the specific shape of the resulting CNC toolpath will depend on the nature of the second topological space. Thus, by selecting the transformation used to push-forward the offset surface from the first topological space to the second topological space, the shape of the resulting CNC toolpath can be changed in ways that provide beneficial improvements over a conventional CNC toolpath generated with no offset surface transformations. To reuse the "saddle" example from above, a conventional CNC toolpath will often cause the CNC tool to start at the two outer peaks of the saddle and converge toward the saddle trough, causing wrinkling of the sheet metal starting material. However, when the offset surface is transformed to a suitable second topological space—e.g., a manifold space—the resulting transformation of the offset surface can create a new, higher peak that was not present in the original geometry of the offset surface. This new, higher peak will then correspond to the highest contour in the sequence, causing the eventual CNC toolpath to start at the location of the peak. Because the plurality of contours are generated within the second topological space, the effects of this new, transformed peak will still be felt even after the contours are pulled back to the first topological space, and this can beneficially affect the CNC toolpath generated for the offset surface as will be described in more detail below.

The subject disclosure primarily focuses on ISF, in which the starting material is a sheet metal blank. However, it will be understood that the offset surface transformations described herein can be beneficially applied to any suitable type of CNC manufacturing.

FIG. 2 shows an example method 200 for CNC manufacturing. Method 200 can be implemented by any suitable computing system of one or more computing devices. Such computing devices can each have any suitable hardware configuration and form factor. In some implementations, method 200 can be implemented by logic subsystem 108 of FIG. 1 and/or computing system 1100 of FIG. 11.

At 202, method 200 includes computer-reading a digital model of a 3D part within a first topological space. This is schematically illustrated with respect to FIG. 3, which graphically represents a digital model 300 of an example 3D part. The digital model can be saved as any suitable computer-readable data structure, e.g., a mesh-based representation in which X,Y,Z coordinates are specified for a large plurality of vertices in combination with a connectivity array that specifies, for each face of the mesh, the vertices that define it. As non-limiting examples, the digital model of the 3D part can be encoded in a mesh format using any of the following filetypes: STL, OBJ, PLY, FBX, DAE, 3DS, and VRML. Alternatively, the 3D part can be represented as a set of trimmed parametrically defined surfaces. As non-limiting examples, the digital model of the 3D part can be encoded using the paradigm of trimmed parametric surfaces with the following filetypes: STEP file formats such as AP204 and AP213, as well as the IGES, SAT, Parasolids (.X_T) and ACIS file (.SAT) formats. Other suitable representations of a digital model include native CAD file formats that encode parametric model generation information. As non-limiting examples, the digital model of the 3D part can be encoded using the paradigm of parametric CAD data using the file formats associated with CAD programs such as Catia®, 3DX®, SolidWorks®, Creo®, ProEngineer®, NX®, SolidEdge®, or Inventor®. Further suitable representations of geometry include implicit representations of geometry, medial axis representations of geometry, as well point clouds for which a mesh can subsequently be generated.

As shown, the 3D part includes a saddle-shaped feature 302, which can present challenges in generating a conventional CNC toolpath as discussed above. Furthermore, in FIG. 3, the digital model of the 3D part is rendered within a first topological space, which in this case is Euclidean space. In other words, the shape and dimensions of the digital model in FIG. 3 are consistent with a physical version of the 3D part existing in the real world.

It will be understood that, while digital model 300 is graphically represented in FIG. 3, this is done only for the sake of illustration. In practice, "computer-reading" a digital model of a 3D part need not include visually rendering the digital model for display. Rather, as one example, "computer-reading" a digital model of a 3D part can include loading all or part of the digital model into computer memory, from which it can be used to generate a CNC toolpath as will be described in more detail below.

The digital model of the 3D part can be stored by any suitable computer storage device of a computing system. As one example, the digital model of the 3D part can be stored by, and retrieved from, storage subsystem 110 depicted in FIG. 1. The digital model of the 3D part need not be stored by the same computing device(s) that implements steps of method 200. Rather, a computing device can computer-read the digital model of the 3D part from its own local storage, retrieve the digital model of the 3D part from a separate computing device, and/or retrieve the digital model of the 3D part from a standalone storage device. In some cases, the digital model of the 3D part can be retrieved over a computer network, such as the Internet. For example, the digital model of the 3D part can be retrieved from a remote database.

Figure 4A:
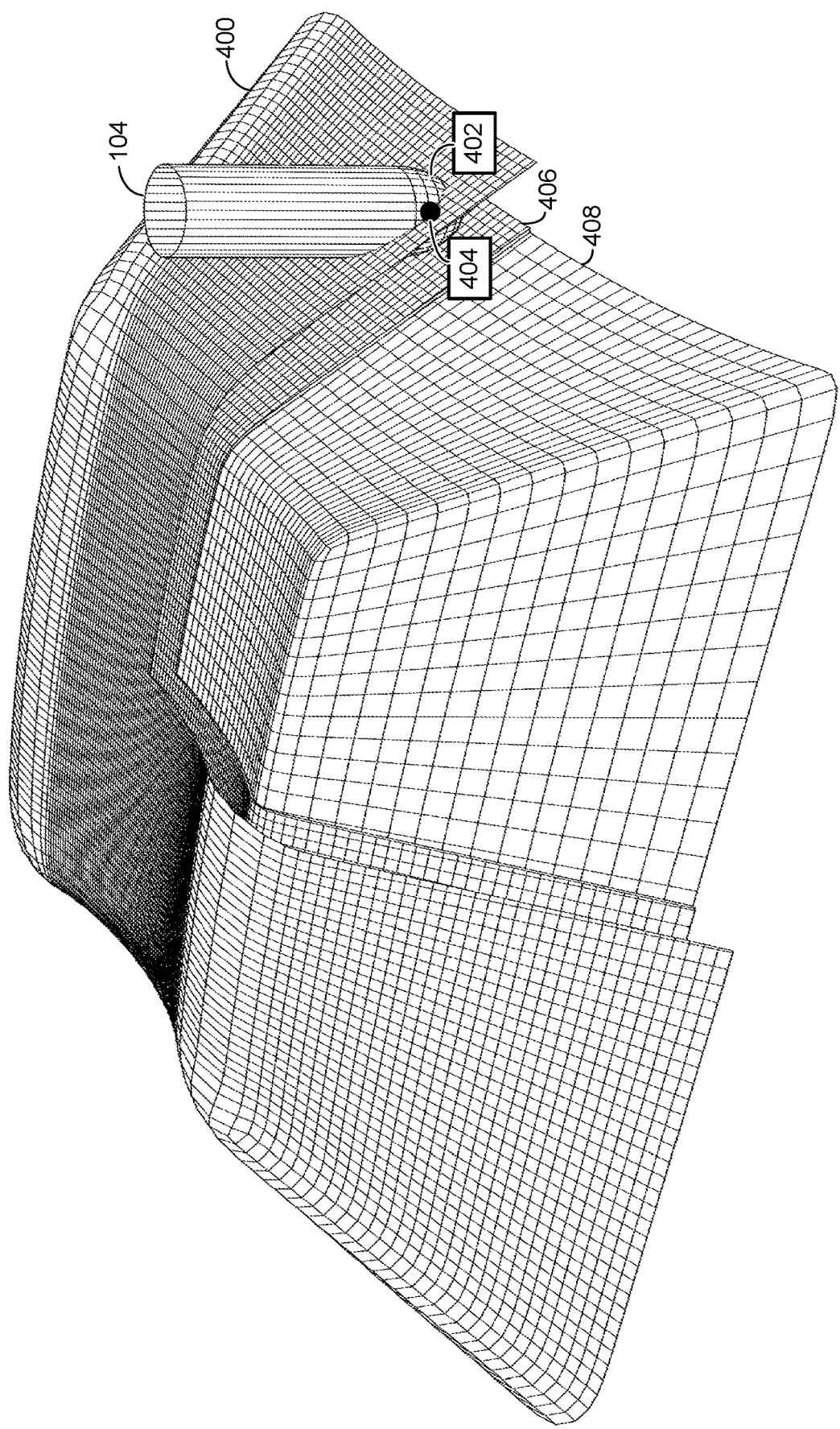
FIGS. 4A and 4B show representations of portions of an offset surface computer-generated for the digital model of FIG. 3 in a first topological space.

Returning briefly to FIG. 2, at 204, method 200 includes computer-generating an offset surface for the digital model in the first topological space. This is illustrated in FIG. 4A, which shows an example offset surface 400. FIG. 4A also depicts a starting material 406, which is in the process of being plastically deformed to manufacture a 3D part corresponding to digital model 300, by conforming the starting material to a die 408.

FIG. 4A also includes a representation of CNC tool 104, including a tool surface 402 that makes contact with the starting material during manufacturing, and an offset reference point 404. Offset surface 400 defines a set of 3D points in the first topological space that, when coincident with the offset reference point of the CNC tool, correspond to contact between the tool surface of the CNC tool and a surface of the 3D part at a specified tooling depth. In other words, the 3D part can be manufactured by moving the CNC tool along a toolpath that causes the offset reference point of the CNC tool to be coincident with at least a subset of the 3D points of the offset surface.

Figure 4B:
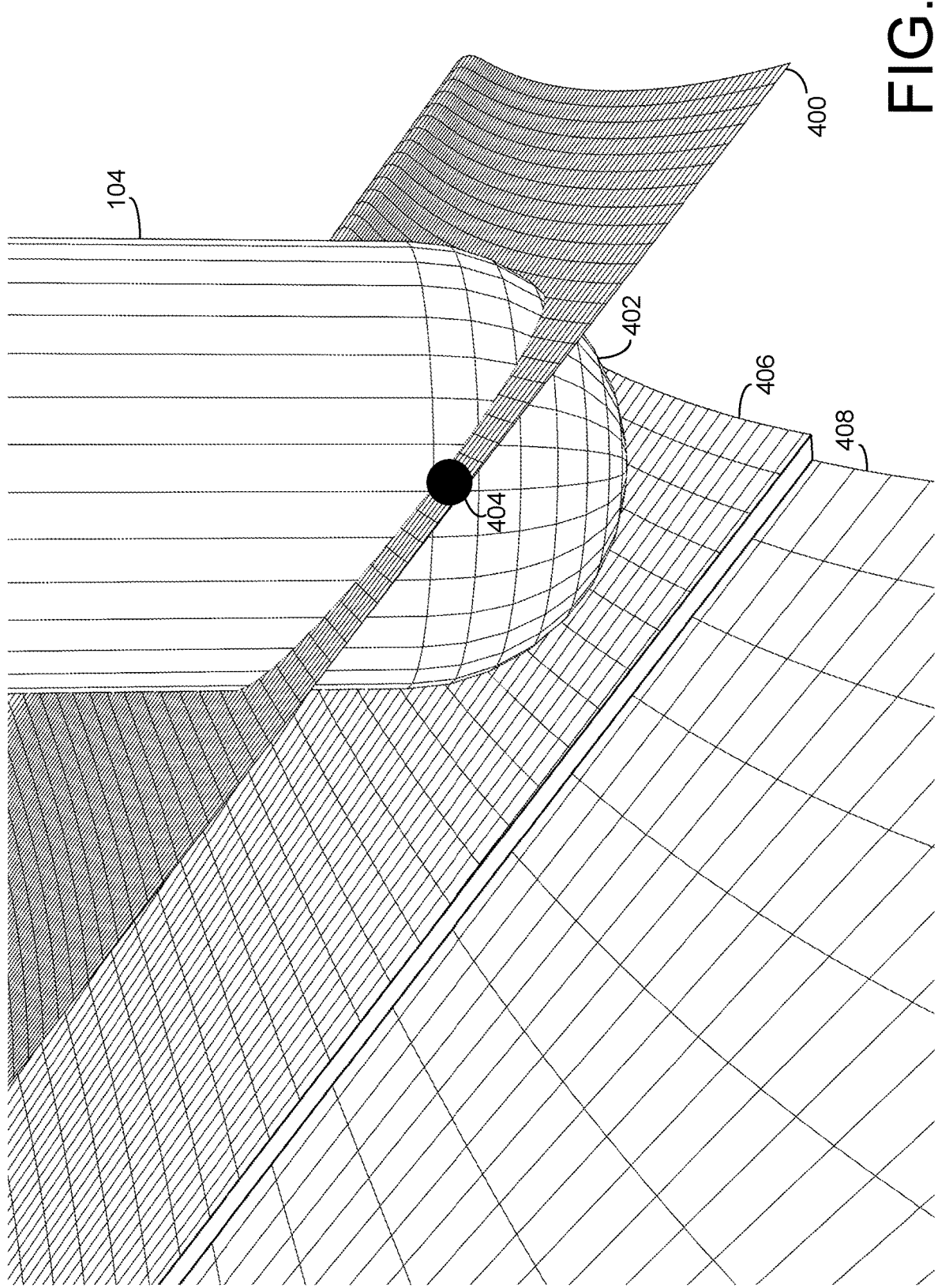

This is illustrated with respect to FIG. 4B, showing a zoomed-in view of the contact between the tool surface 402 of CNC tool 104 and starting material 406. As shown, offset reference point 404 is coincident with offset surface 400, causing contact between tool surface 402 and starting material 406. In this specific example, the starting material is a sheet metal blank, and the CNC tool is plastically deforming the sheet metal blank to conform to the shape of die 408, as part of an ISF manufacturing process. Thus, rather than merely touching the surface of the starting material, the tool surface contacts the starting material at a specified tooling depth to manipulate the starting material in a desired manner. In this case—to plastically deform the sheet metal into the shape of the 3D part, without penetrating through and damaging the sheet metal. In other examples, however, the tool surface can contact the surface of the 3D part with any suitable tooling depth depending on the nature of the manufacturing process in question. For example, in subtractive manufacturing scenarios, the tool surface can contact the starting material at a tooling depth sufficient for machining the 3D part—e.g., removing a desired amount of matter from the surface of the starting material.

In the example of FIGS. 4A and 4B, the offset reference point of the CNC tool is positioned at the center of the hemispherical surface of the CNC tool head. It will be understood that this is a non-limiting example. In general, the offset reference point can have any suitable position with respect to the CNC tool, including the tip of the tool surface. Notably, the relationship between the offset surface and digital model of the 3D part will change depending on the position of the offset reference point of the CNC tool, as well as the shape of the tool head. As described above, the offset surface defines a set of 3D points that, when coincident with the offset reference point of the CNC tool, correspond to contact between the tool surface and 3D part. Thus, when the offset reference point has a different position with respect to the CNC tool, and/or the tool surface has a different size or shape, a different offset surface will be generated for the digital model.

Figure 5A:
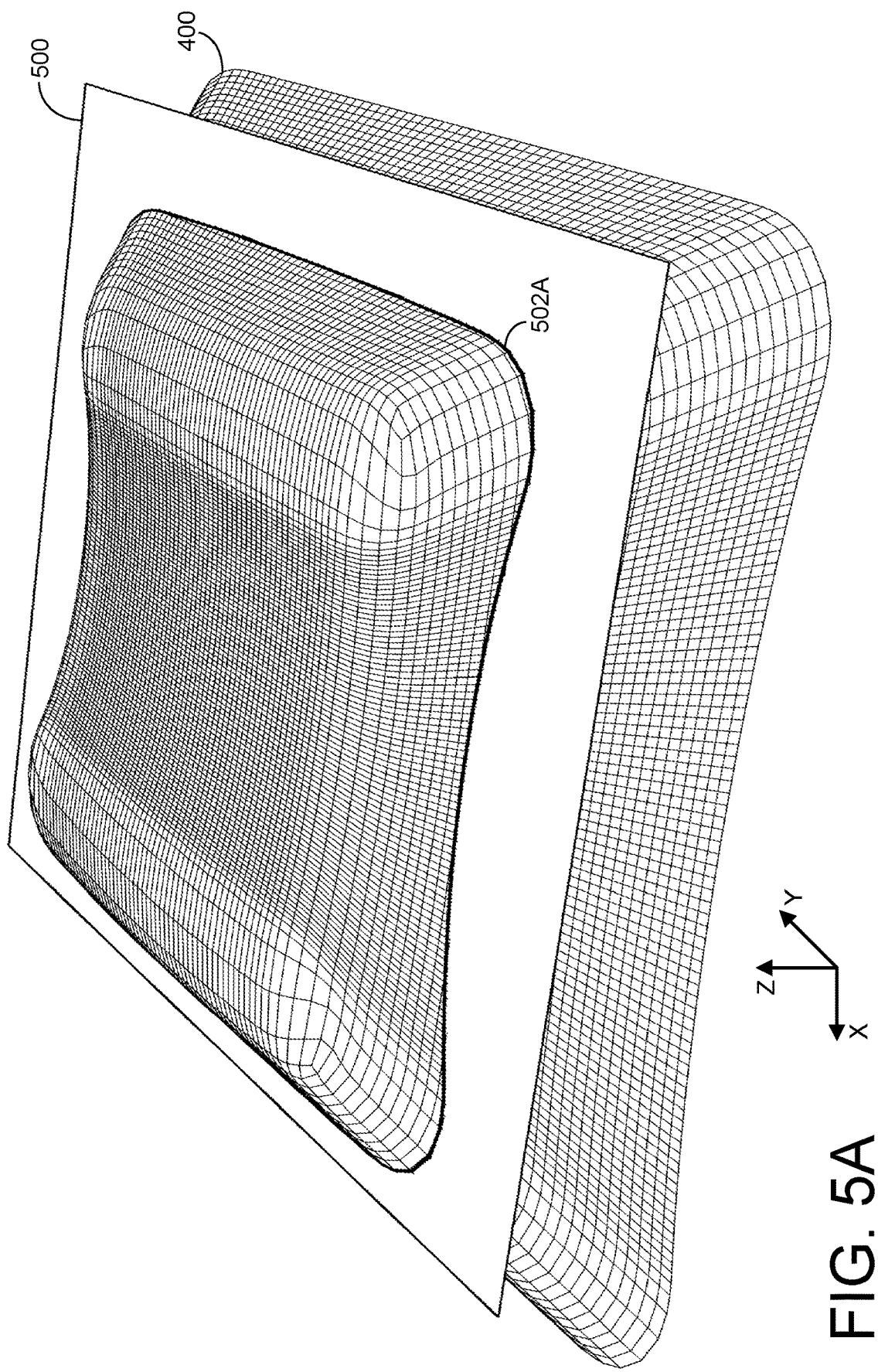
FIG. 5A shows a representation of a portion of the offset surface of FIGS. 4A and 4B intersected with a plane to give a contour.

As discussed above, once the offset surface is computer-generated, the offset surface is intersected with a plurality of parallel planes in the embedded space to give a plurality of contours. This is illustrated with respect to FIG. 5A, depicting a representation of offset surface 400 intersected with a plane 500 to give a contour 502A at the intersection. For the sake of visual clarity, only one plane and corresponding contour are depicted in FIG. 5A. It will be understood, however, that in practical examples the offset surface can be intersected with dozens, hundreds, or any finite number of planes, each parallel to one another, and each forming a corresponding contour at the intersection between the plane and the offset surface.

Figure 5B:
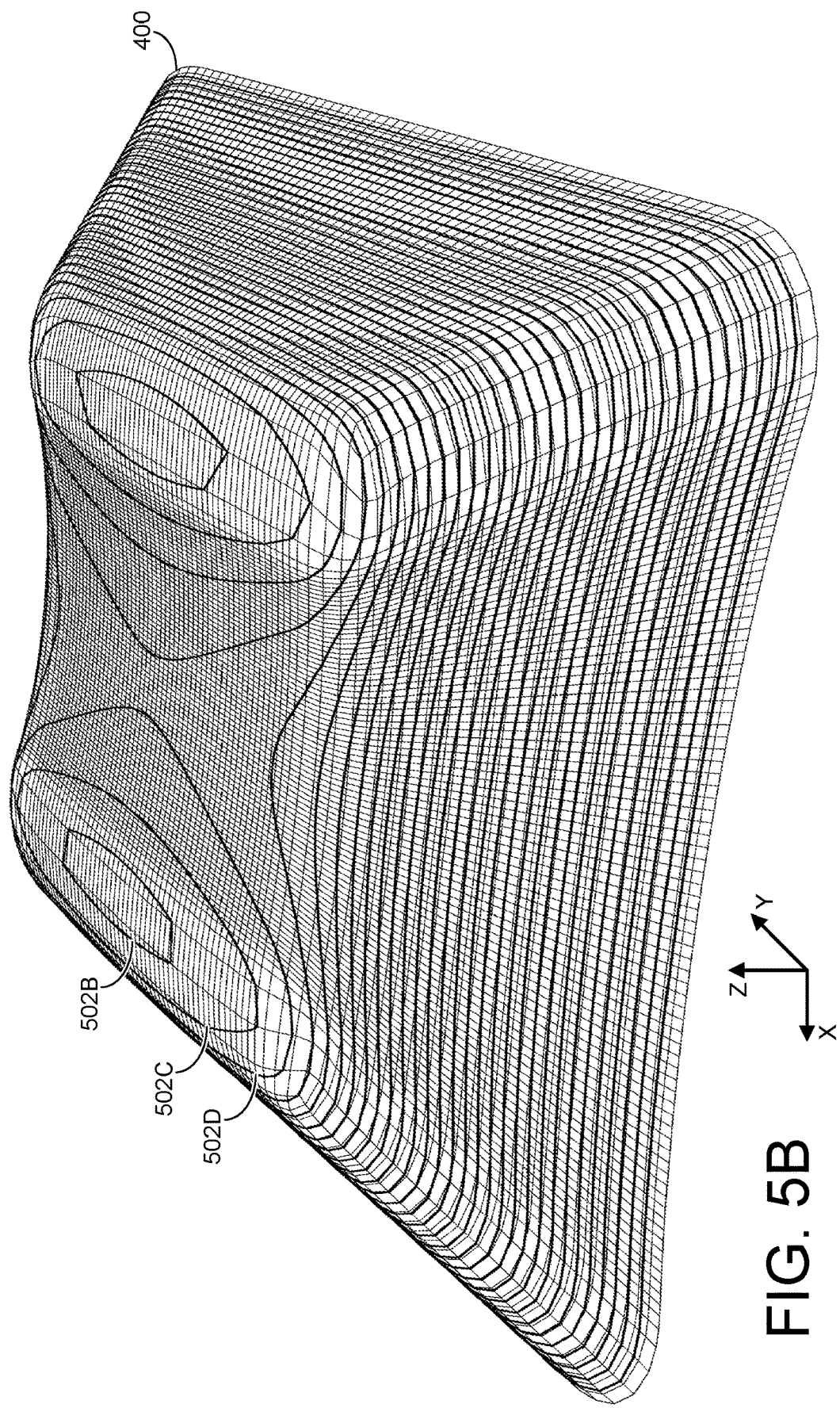
FIG. 5B shows a representation of the offset surface of FIGS. 4A and 4B with a plurality of contours.

This is illustrated with respect to FIG. 5B, again showing a representation of offset surface 400. In FIG. 5B, the offset surface is shown with a plurality of contours, including loops 502B, 502C, and 502D. Each contour depicted in FIG. 5B is generated by an intersection between a plane that is parallel to plane 500, and offset surface 400.

There can be any suitable spacing between each parallel plane, which can be defined depending on the implementation and size/shape of the 3D part to be manufactured. The spacing between the planes can be uniform or can vary with respect to the Z-axis. Each of the plurality of planes can be perpendicular to the Z-axis in the embedding space, as is depicted in FIGS. 5A and 5B. In other words, the plurality of planes can be Z-level planes, as discussed above. In other examples, however, the plurality of parallel planes can have any suitable relationship with respect to the X, Y, and Z axes.

Once the plurality of contours are computer-identified, a CNC toolpath can be generated that traces each of the plurality of contours, the CNC toolpath being useable by a CNC machine to manufacture the 3D part. In other words, the CNC toolpath defines a set of movements for the CNC tool that, when performed, cause the offset reference point of the CNC tool to move between a given subset of the set of 3D points of the offset surface in a specified order. As discussed above, the CNC toolpath uses a "top-down" approach by starting with the highest contour relative to the Z-axis, then sequentially moving on to the next-highest contour, until each line has been traced. Notably, such movements are defined such that the tool surface of the CNC tool remains at positions contacting or external to the surface of the 3D part to be manufactured.

Figure 6A:
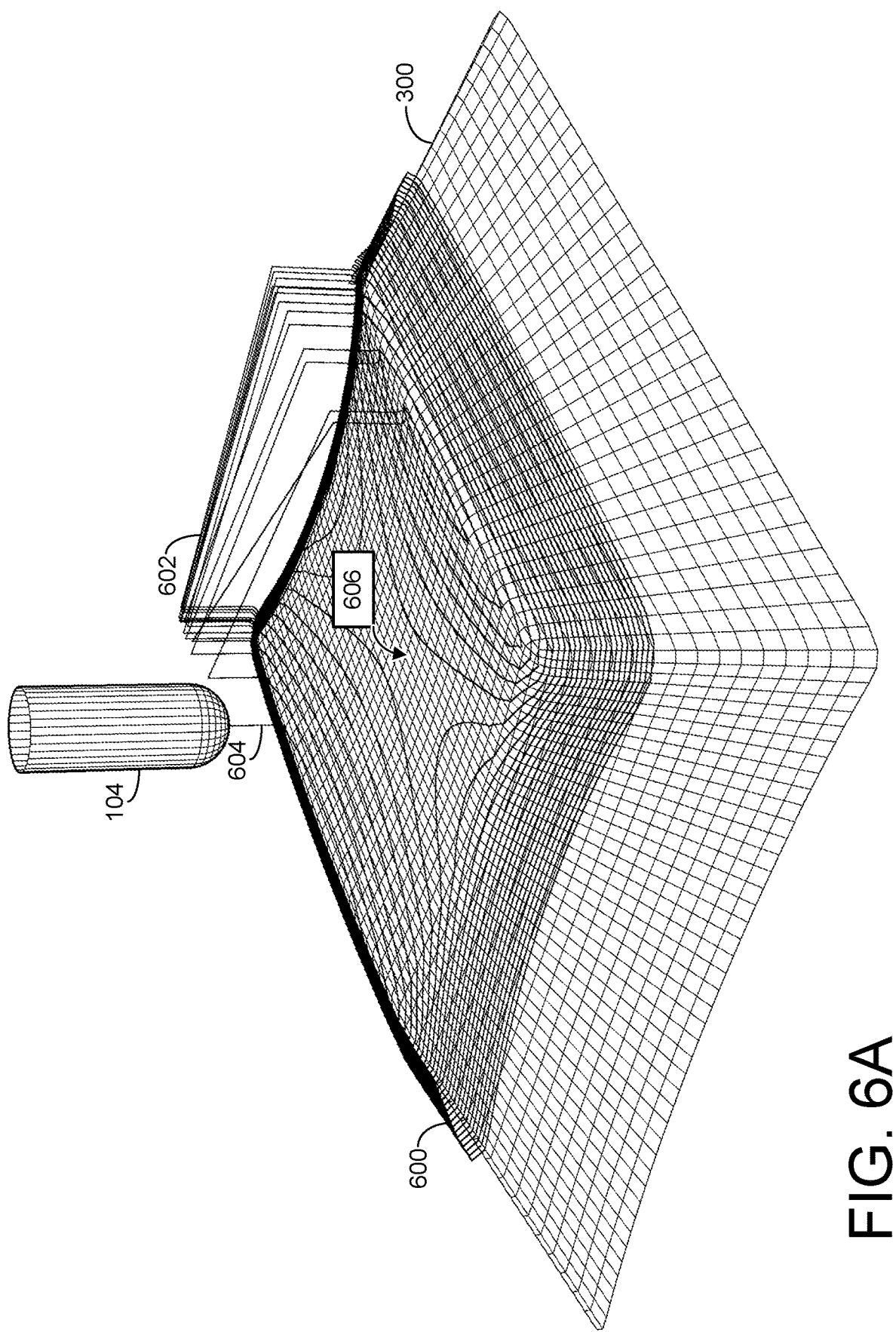
FIG. 6A shows a representation of a CNC toolpath generated for a portion of the digital model of FIG. 3.

FIG. 6A shows a representation of digital model 300, for which a CNC toolpath 600 has been computer-generated. The CNC toolpath is indicated by the plurality of black lines disposed above the surface of digital model 300, and represent movements to be taken by CNC tool 104 in the process of manufacturing the 3D part. The CNC toolpath includes movements tracing each of the contours that were computer-identified as described above. The CNC toolpath also links the plurality of open and/or closed contours in a sequential order with transitional movements 602 that maintain the tool surface at positions contacting or external to the surface of the 3D part. In other words, after tracing one contour, the CNC tool follows a transitional movement to the next contour in the sequence, in a manner that does not cause the CNC tool to collide with or penetrate the 3D part during the transition. For example, the transitional movements can cause the CNC tool to move above a clearance plane as it moves from one contour to the next at the same Z level. The CNC toolpath includes a starting movement 604 from a home position of the CNC tool to a first contour in the sequence. The CNC toolpath can also include a terminating movement from the last contour in the sequence back to the home position of the CNC tool, not shown in FIG. 6A.

Figure 6B:
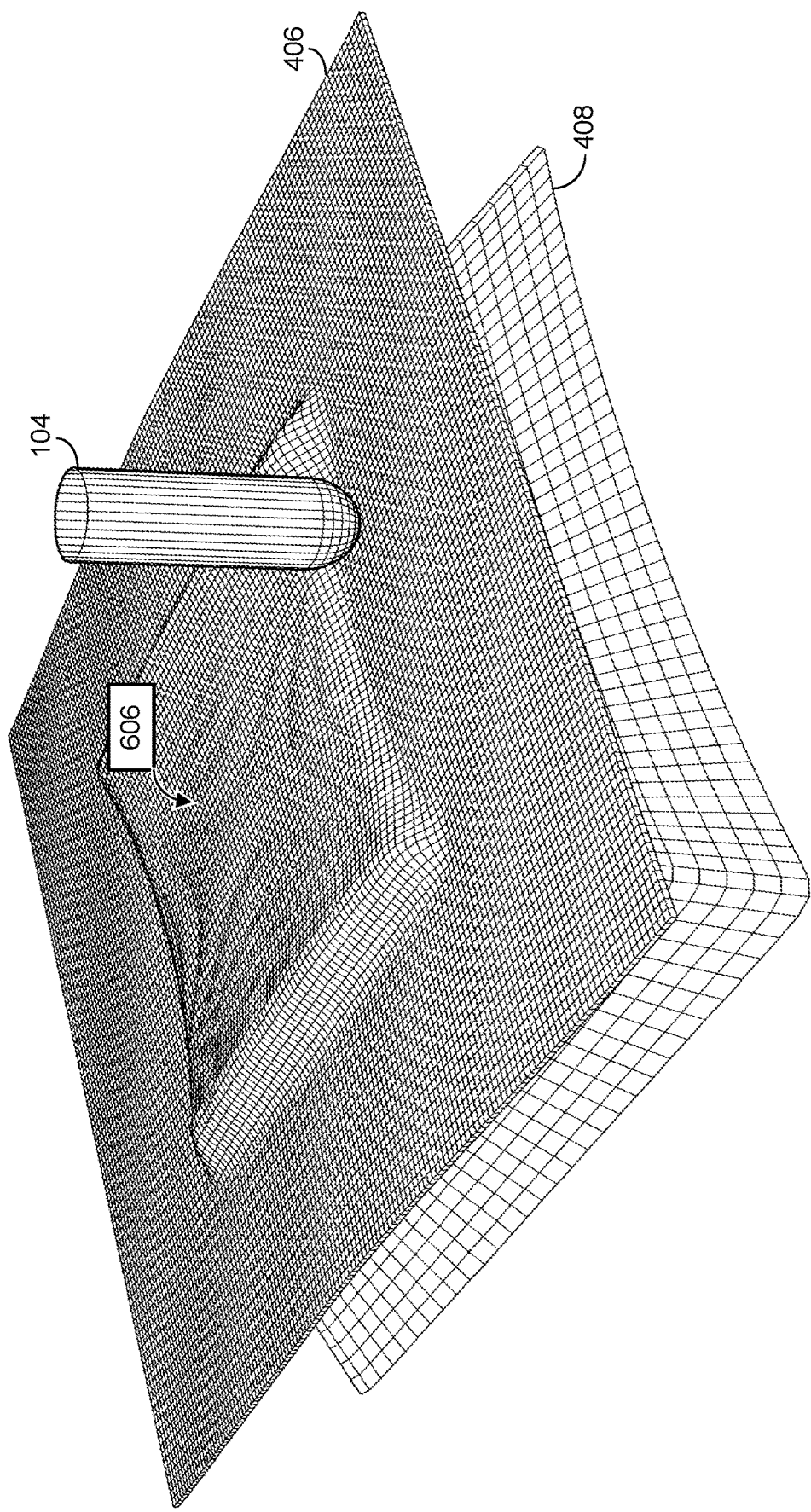
FIG. 6B depicts a simulation of the manufacturing of a 3D part using the CNC toolpath of FIG. 6A, via incremental sheet forming (ISF).

In FIG. 6A, the CNC toolpath starts at the highest contours relative to the Z axis, which in this case correspond to the peaks of the saddle shape. From there, as the CNC tool sequentially traces lower contours, it converges within the trough of the saddle-shaped 3D part to form a cross-shaped pattern 606. As discussed above, this can cause undesirable wrinkling of the sheet metal starting material during CNC manufacturing, as is illustrated in FIG. 6B. Specifically, FIG. 6B represents a simulated scenario in which CNC tool 104 follows CNC toolpath 600 to plastically deform the sheet metal blank 406 into a 3D part, by conforming to die 408. However, as shown, following CNC toolpath 600 has caused wrinkling in the vicinity of cross-shaped pattern 606. This can cause a visual blemish in the 3D part and/or render the part unusable.

Accordingly, as discussed above, this issue can be at least partially mitigated by using offset surface transformations to generate an alternate CNC toolpath based on a transformed plurality of contours. In other words, prior to intersecting the offset surface with a plurality of planes to give a plurality of contours, the offset surface can be transformed to a different topological space. As such, and returning briefly to FIG. 2, at 206, method 200 includes computer-transforming the offset surface in the first topological space to a transformed offset surface in a second topological space embedded in the first topological space.

Figure 7A:
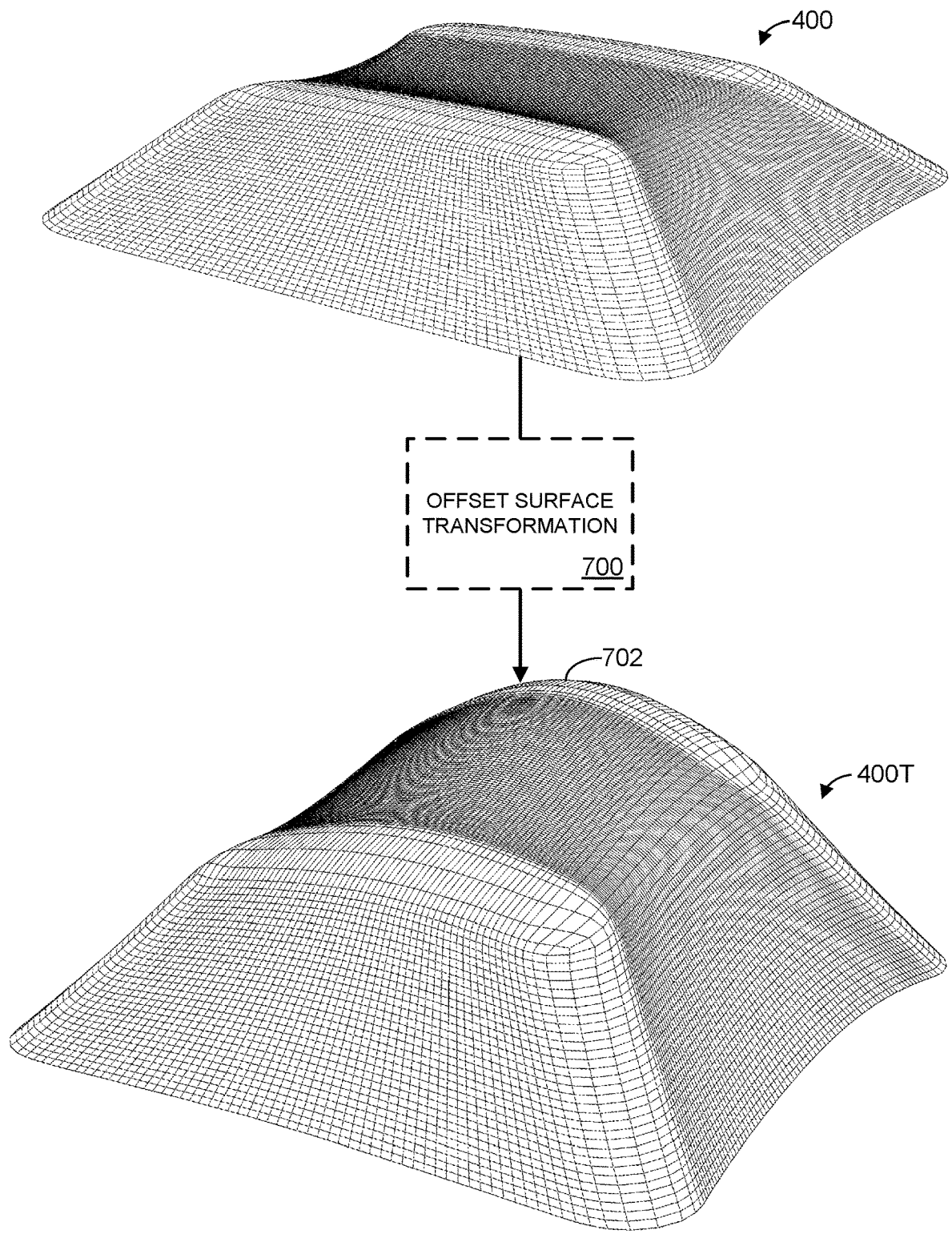

This is illustrated with respect to FIG. 7A, which again shows a representation of offset surface 400. In FIG. 7A, an offset surface transformation 700 is applied to offset surface 400, resulting in a transformed offset surface 400T. Specifically, transforming the offset surface has created a higher peak 702 on one side of the transformed offset surface, which gradually slopes downward toward the opposite side of the transformed offset surface. Peak 702 can beneficially affect a CNC toolpath ultimately generated for the offset surface, as will be described in more detail below.

FIG. 7B provides another illustration of the transformation of the offset surface. FIG. 7B shows a representation of digital model 300, along with original offset surface 400 and transformed offset surface 400T, to illustrate the difference in shape between the original and transformed offset surfaces. In FIG. 7B, transformed offset surface 400T is partially cut away to reveal offset surface 400 and digital model 300. Similarly, offset surface 400 is partially cut away to reveal digital model 300.

The specific nature of the second topological space, as well as the transformation used to push-forward the offset surface into the second topological space, will vary from implementation to implementation. The second topological space can be any topological space having different properties from the first topological space. The second topological space can be a curved space—e.g., a three-dimensional space that is non-Euclidean, such that the angles of a triangle within the second topological space do not sum to one hundred and eighty degrees.

For instance, the second topological space can be a manifold space, such as a graph-type manifold. This is the case in FIGS. 7A and 7B, in which the second topological space is a manifold space defined by the following map:

$$x'=x, y'=y, z'=z+150e^{(-0.00001x^2-0.00001(y-150)^2)}$$

In other examples, however, other suitable manifolds, and/or other suitable non-manifold spaces, can be used. In general, graph-type $\mathbb{R}^3$ manifold mappings can take the form of:

$$\begin{bmatrix} x'_1 \\ x'_2 \\ x'_3 \end{bmatrix} = \begin{bmatrix} x_1 \\ x_2 \\ x_3 + f(x_1, x_2) \end{bmatrix}$$

As a specific example of a graph-type manifold mapping:

$$\begin{bmatrix} x'_1 \\ x'_2 \\ x'_3 \end{bmatrix} = \begin{bmatrix} x_1 \\ x_2 \\ x_3 + u(x_1 - a)^2 + v(x_2 - b)^2 \end{bmatrix}$$

An advantageous CNC toolpath can be generated by first identifying a location on the offset surface at which the CNC toolpath should be started to mitigate or prevent a manufacturing issue (e.g., sheet metal wrinkling), then identifying a second topological space that will transform the offset surface in such a way as to raise the level of the identified location above the rest of the offset surface. This will cause the resulting CNC toolpath to start at the identified location, because the raised location will correspond to the highest contour relative to the Z-axis, and the effects of the raised location will be felt even when the contours are later transformed back to the first topological space. Furthermore, the offset transform provides a smooth transition of the CNC toolpath between the new starting location and the rest of the part covered by the CNC toolpath. Use of offset surface transformations as described herein can also improve thermal management. For example, it may be advantageous to specify a starting location other than the highest point in order to manage temperature increases in a process where the deposition of material causes heat on the part that is subjected to the deposition.

Returning briefly to FIG. 2, at 208, method 200 includes computer-identifying a plurality of contours at which a corresponding plurality of parallel lines intersect the transformed offset surface in the second topological space. This can be done substantially as described above with respect to FIGS. 5A and 5B, but applied to the transformed offset surface in the second topological space rather than the original offset surface in the first topological space.

Figure 8:
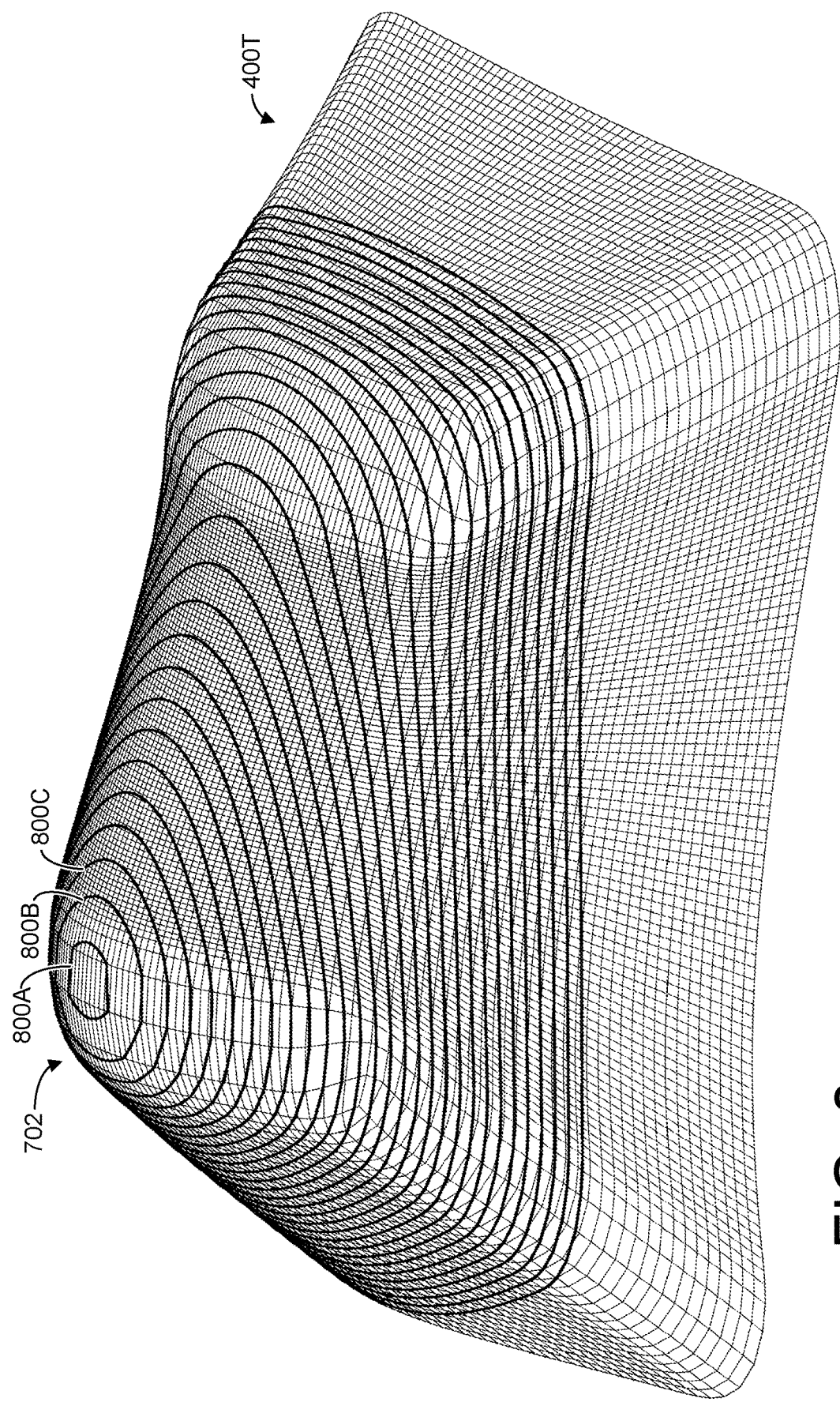
FIG. 8 shows a representation of the transformed offset surface of FIG. 7 with a plurality of contours.

This is illustrated with respect to FIG. 8, showing a representation of transformed offset surface 400T with a plurality of contours, including contours 800A, 800B, and 800C. Notably, the plurality of contours can be identified by intersecting transformed offset surface 400T with a plurality of parallel planes in the embedding space, such as plane 500 shown in FIG. 5A, then tracing each plane-to-surface intersection to give a contour, such as contour 502A in FIG. 5A. As discussed above, the plurality of parallel planes can be Z-level planes. In other words, and in cases where the second topological space has a linear Z-axis, the plurality of embedded parallel planes can be perpendicular to the linear Z-axis.

Returning briefly to FIG. 2, at 210, method 200 includes computer-transforming the plurality of contours in the second topological space into a plurality of transformed contours in the first topological space. In other words, after the plurality of contours are identified for the transformed offset surface in the second topological space, the contours can be pulled-back to the first topological space to give a plurality of transformed contours. The transformation from the second topological space to the first topological space is the inverse of the transformation from the first topological space to the second topological space, such that the transformed contours are constrained to the offset surface in the first topological space. Thus, an alternate CNC toolpath can be generated that traces the plurality of transformed contours, while still being useable to manufacture the 3D part.

Figure 9A:
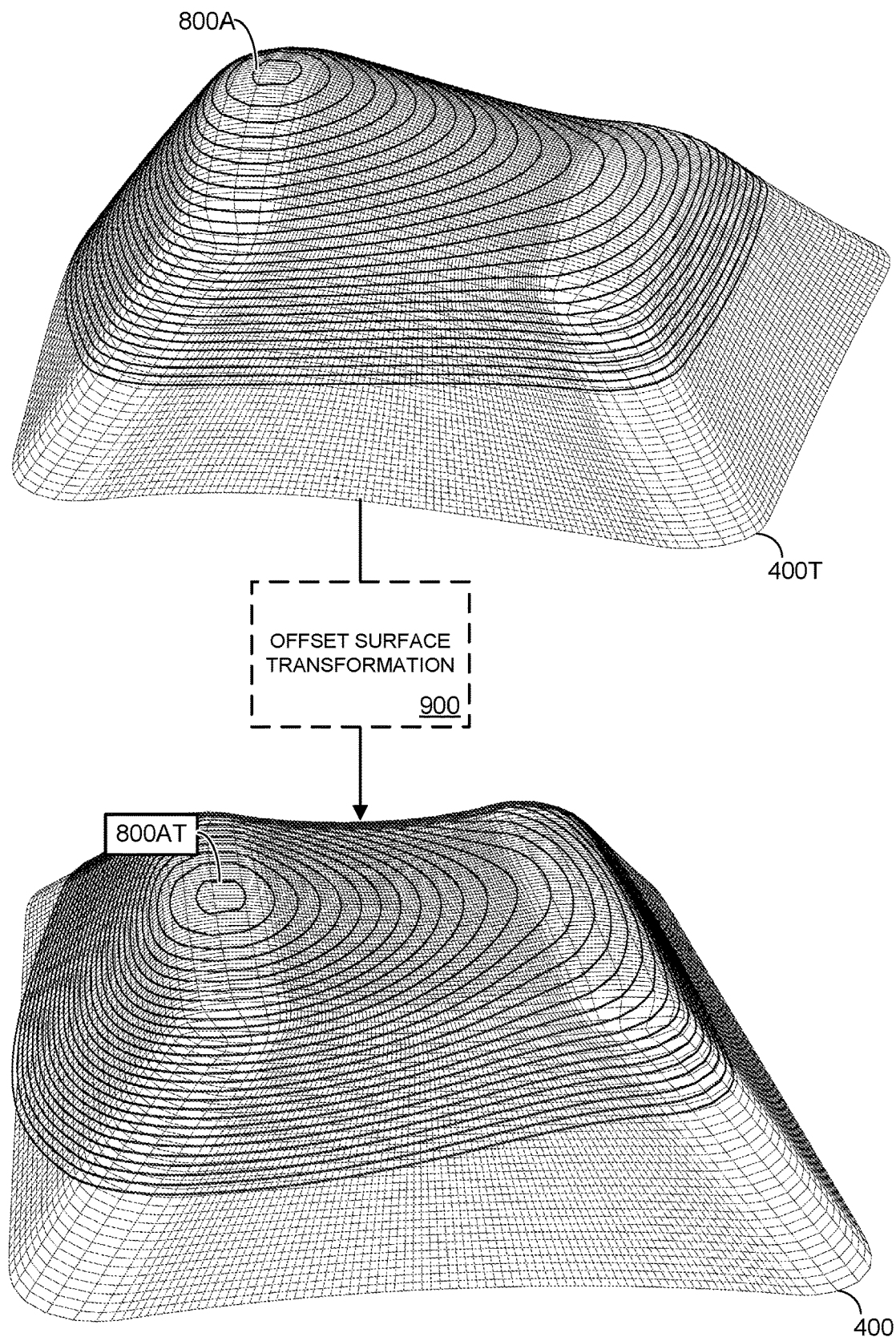
FIG. 9A illustrates transformation of the offset surface and corresponding contours of FIG. 8 back to the first topological space.

This is illustrated with respect to FIG. 9A. As shown, another offset surface transformation 900 is applied to the plurality of contours of transformed offset surface 400T in the second topological space. This has the effect of transforming contour 800A into transformed contour 800AT. Offset surface transformation 900 is the inverse of transformation 700 described above with respect to FIG. 7A and FIG. 7B. In this manner, the geometry of the offset surface can be restored to how it was prior to transformation 700—i.e., prior to transformation of the offset surface into the second topological space.

FIG. 9B depicts another representation of offset surface 400 in the first topological space. As shown, the transformation has affected the plurality of contours identified for the transformed offset surface. The contours are now a plurality of transformed contours, including lines 800AT, 800BT, and 800CT, the shapes of which differ from their non-transformed counterparts 800A, 800B, and 800C. Furthermore, the set of transformed contours shown in FIG. 9B differ from the contours depicted in FIG. 5B, as a result of the offset surface having previously been transformed to the second topological space.

Notably, the contours described above with respect to FIGS. 5A and 5B are planar in the first topological space, given that the lines were identified via intersections between the offset surface and a plurality of parallel planes in the first topological space. Similarly, the contours identified for transformed offset surface 400T, as depicted in FIG. 8, are planar in the second topological space. However, pulling-back the offset surface from the second topological space to the first topological space can disrupt the planar nature of the contours. In other words, at least one transformed contour of the plurality of transformed contours can be non-planar in the first topological space, such that one or more transformed contours are curved or bent with respect to one or more of the X, Y, and Z axes in the first topological space.

Returning briefly to FIG. 2, at 212, method 200 includes computer-generating a CNC toolpath that traces each of the plurality of transformed contours in the first topological space, the CNC toolpath useable by a CNC machine to manufacture the 3D part. As described above, the CNC toolpath defines a set of movements for the CNC tool that, when performed, cause the CNC tool to move between a given subset of the points of the set of 3D points of the offset surface. See, for example, FIG. 4B, in which offset reference point 404 is coincident with offset surface 400 while shaping sheet metal blank 406.

Figure 10A:
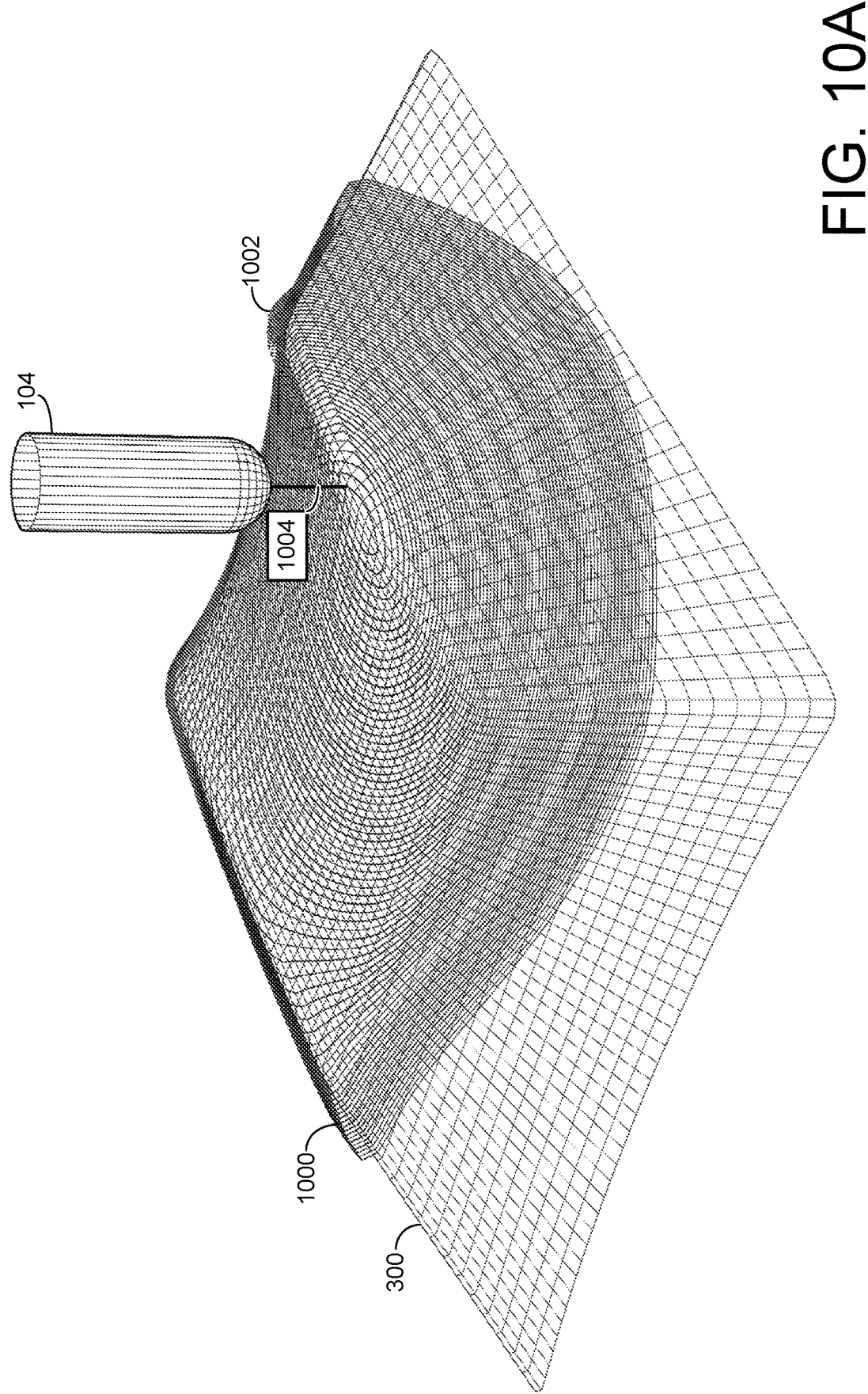
FIG. 10A shows a representation of a CNC toolpath generated for the offset surface of FIG. 9B.

FIG. 10A depicts a representation of digital model 300 of a 3D part, for which a CNC toolpath 1000 has been generated, indicated by the black lines overlaid on digital model 300. In other words, CNC toolpath 1000 defines a set of movements to be performed by CNC tool 104 to manufacture the 3D part. The CNC toolpath is computer-generated such that it traces each of the plurality of transformed contours, including the transformed contours depicted in FIG. 9B. Computer-generating the CNC toolpath can further comprise linking the plurality of transformed contours in a sequential order with transitional movements, such as transitional movements 1002 in FIG. 10A. These transitional movements maintain the tool surface of the CNC tool at positions contacting or external to a surface of the 3D part, to prevent the CNC tool from colliding with, or penetrating the starting material in damaging or destructive ways. Computer-generating the CNC toolpath can further comprise adding a starting movement from a home position to a first transformed contour in the sequential order. FIG. 10A depicts a starting movement 1004 for the CNC tool to the first transformed contour. The CNC toolpath can also include a terminating movement from the last transformed contour back to the home position of the CNC tool, not shown in FIG. 10A.

Notably, CNC toolpath 1000 depicted in FIG. 10A differs from CNC toolpath 600 depicted in FIG. 6, as a result of the offset surface transformation described above. In particular, CNC toolpath 600 starts by alternating between the two peaks of the saddle while gradually converging toward the saddle trough. This creates cross-shaped pattern 606, and results in wrinkling of the sheet metal starting material as is shown in FIG. 6B. By contrast, CNC toolpath 1000 starts at the highest position of peak 702 in transformed offset surface 400T, which prevents the toolpath from forming a cross-shaped pattern in the saddle trough. Thus, the wrinkling issue described above is alleviated, and CNC toolpath 1000 can be used to form 3D parts of generally higher quality by virtue of the offset surface transformations described herein.

Figure 10B:
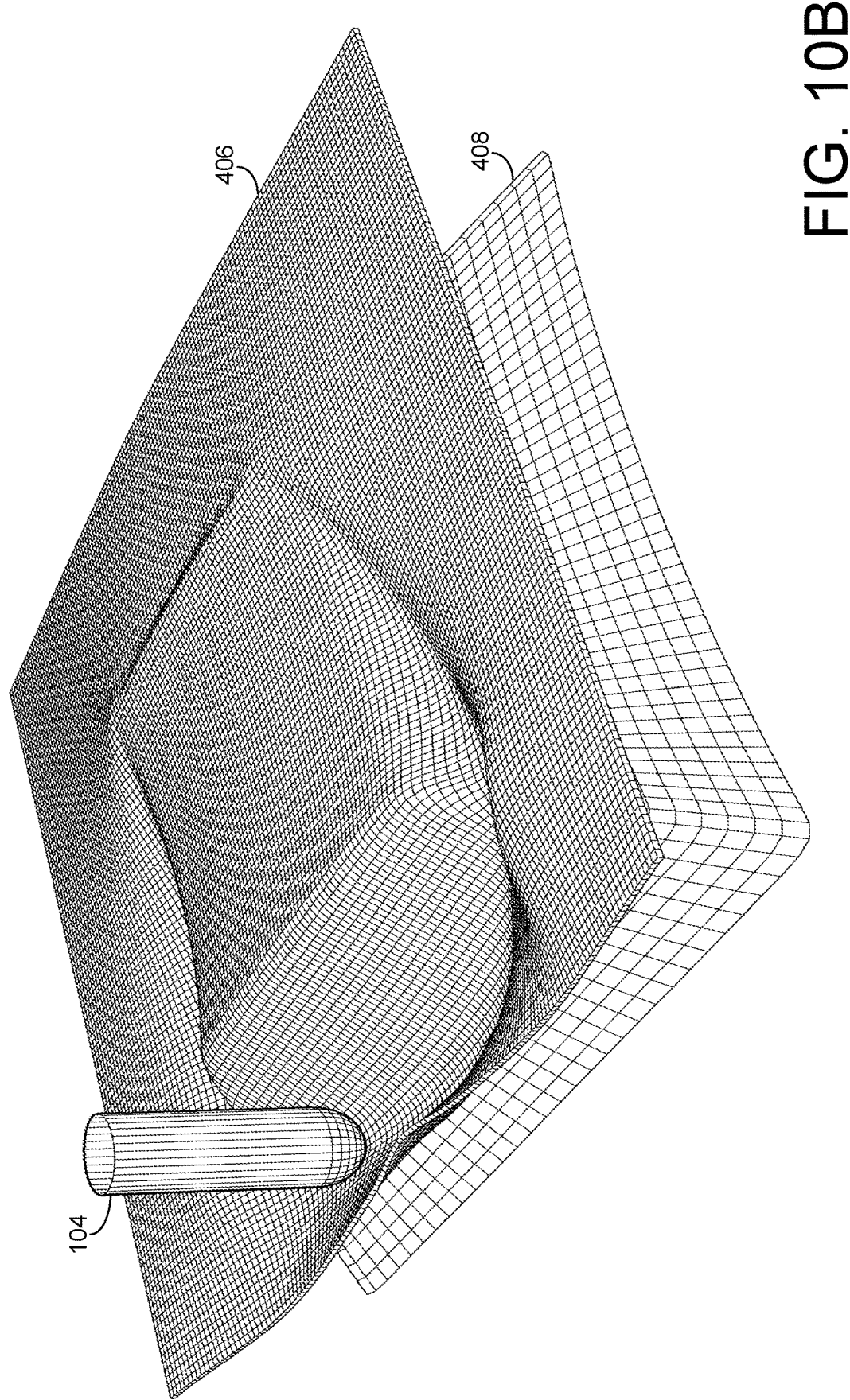
FIG. 10B depicts a simulation of the manufacturing of a 3D part using the CNC toolpath of FIG. 10A via ISF.

Returning briefly to FIG. 2, at 214, method 200 includes manufacturing the 3D part with a CNC tool of a CNC machine. This can include controlling a movement of or moving the CNC tool of the CNC machine along the CNC toolpath to form the 3D part from a sheet metal blank starting material via ISF. This is illustrated with respect to FIG. 10B, depicting a simulated scenario in which CNC tool 104 forms starting material 406 into a desired shape by following CNC toolpath 1000. In contrast to the scenario illustrated in FIG. 6B, CNC toolpath 1000 does not cause wrinkling of starting material 406 inside the area of interest, and thus provides an advantage over CNC toolpath 600 generated with no offset surface transformations.

Again, the subject disclosure has primarily focused on CNC manufacturing involving ISF, in which the starting material is sheet metal. However, as described above, "manufacturing" can include any number of suitable CNC-facilitated techniques. For instance, the offset surface transformations described herein can be applied to suitable additive manufacturing techniques, such as 3D printing, in which case at least one step in manufacturing the 3D part can include moving the CNC tool along the CNC toolpath to print the 3D part from a starting material, or to deposit material onto a suitably shaped substrate. Additionally, or alternatively, the offset surface transformations described herein can be applied to suitable subtractive manufacturing techniques. Thus, as non-limiting examples, at least one step in manufacturing the 3D part can include moving the CNC tool along the CNC toolpath to machine the 3D part from a starting billet of material, or to polish, spray paint, or shot peen an already-formed 3D part. Furthermore, the offset surface transformations can be applied to other manufacturing techniques besides ISF that alter the shape of a starting material without adding or removing substantial amounts of matter.

The methods and processes described herein can be tied to a computing system of one or more computing devices. In particular, such methods and processes can be implemented as an executable computer-application program, a network-accessible computing service, an application-programming interface (API), a library, or a combination of the above and/or other compute resources.

Figure 11:
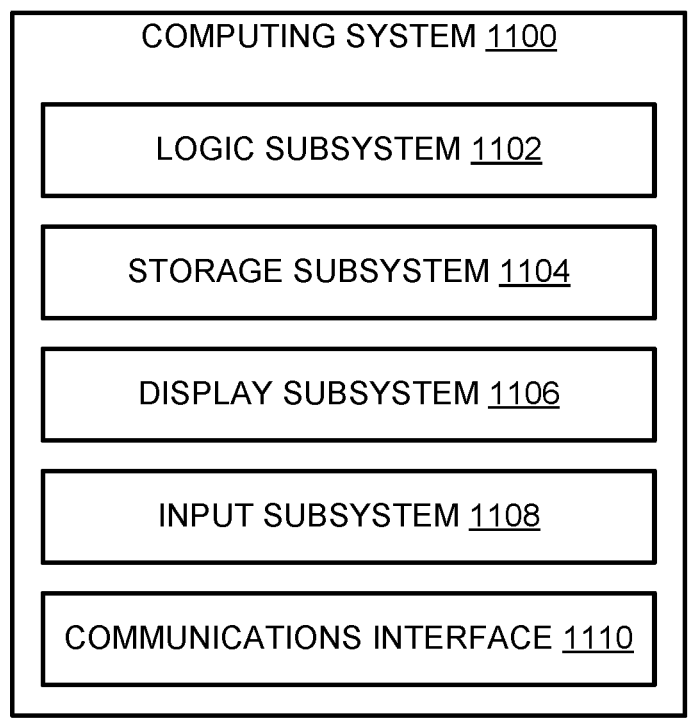
FIG. 11 shows a schematic representation of an example computing system.

FIG. 11 schematically shows a simplified representation of a computing system 1100 configured to provide any to all of the compute functionality described herein. Computing system 1100 can take the form of one or more personal computers, network-accessible server computers, tablet computers, mobile computing devices, mobile communication devices (e.g., smart phone), embedded computing devices, and/or other computing devices. Computing system 1100 can take the form of a CNC tool control system communicatively coupled with a computer-controlled CNC tool movement assembly, such as assembly 106 of FIG. 1.

Computing system 1100 includes a logic subsystem 1102 and a storage subsystem 1104. Computing system 1100 can optionally include a display subsystem 1106, input subsystem 1108, communication subsystem 1110, and/or other subsystems not shown in FIG. 11.

Logic subsystem 1102 includes one or more physical devices configured to execute instructions. For example, the logic subsystem can be configured to execute instructions that are part of one or more applications, services, or other logical constructs. The logic subsystem can include one or more hardware processors configured to execute software instructions. Additionally, or alternatively, the logic subsystem can include one or more hardware or firmware devices configured to execute hardware or firmware instructions. Processors of the logic subsystem can be single-core or multi-core, and the instructions executed thereon can be configured for sequential, parallel, and/or distributed processing. Individual components of the logic subsystem optionally can be distributed among two or more separate devices, which can be remotely located and/or configured for coordinated processing. Aspects of the logic subsystem can be virtualized and executed by remotely-accessible, networked computing devices configured in a cloud-computing configuration.

Storage subsystem 1104 includes one or more physical devices configured to temporarily and/or permanently hold computer information such as data and instructions executable by the logic subsystem. When the storage subsystem includes two or more devices, the devices can be collocated and/or remotely located. Storage subsystem 1104 can include volatile, nonvolatile, dynamic, static, read/write, read-only, random-access, sequential-access, location-addressable, file-addressable, and/or content-addressable devices. Storage subsystem 1104 can include removable and/or built-in devices. When the logic subsystem executes instructions, the state of storage subsystem 1104 can be transformed—e.g., to hold different data.

Aspects of logic subsystem 1102 and storage subsystem 1104 can be integrated together into one or more hardware-logic components. Such hardware-logic components can include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem can cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine can be instantiated by a single computing device, or a machine can include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality can optionally be saved as one or more unexecuted modules on one or more suitable storage devices.

When included, display subsystem 1106 can be used to present a visual representation of data held by storage subsystem 1104. This visual representation can take the form of a graphical user interface (GUI). Display subsystem 1106 can include one or more display devices utilizing virtually any type of technology. In some implementations, display subsystem can include one or more virtual-, augmented-, or mixed reality displays.

When included, input subsystem 1108 can comprise or interface with one or more input devices. An input device can include a sensor device or a user input device. Examples of user input devices include a keyboard, mouse, touch screen, or game controller. In some embodiments, the input subsystem can comprise or interface with selected natural user input (NUI) componentry. Such componentry can be integrated or peripheral, and the transduction and/or processing of input actions can be handled on- or off-board. Example NUI componentry can include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 1110 can be configured to communicatively couple computing system 1100 with one or more other computing devices. Communication subsystem 1110 can include wired and/or wireless communication devices compatible with one or more different communication protocols. The communication subsystem can be configured for communication via personal-, local- and/or wide-area networks.

This disclosure is presented by way of example and with reference to the associated drawing figures. Components, process steps, and other elements that can be substantially the same in one or more of the figures are identified accordingly and are described with minimal repetition. It will be noted, however, that elements identified coordinately can also differ to some degree. It will be further noted that some figures can be schematic and not drawn to scale. The various drawing scales, aspect ratios, and numbers of components shown in the figures can be purposely distorted to make certain features or relationships easier to see.

In an example, a method for computer numerical control (CNC) manufacturing comprises: computer-reading a digital model of a three-dimensional (3D) part within a first topological space; computer-generating an offset surface for the digital model in the first topological space; computer-transforming the offset surface in the first topological space to a transformed offset surface in a second topological space embedded in the first topological space; computer-identifying a plurality of contours at which a corresponding plurality of embedded parallel planes intersect the transformed offset surface in the second topological space; computer-transforming the plurality of contours in the second topological space into a corresponding plurality of transformed contours in the first topological space; and computer-generating a CNC toolpath that traces each of the plurality of transformed contours in the first topological space, the CNC toolpath useable by a CNC machine to manufacture the 3D part. In this example or any other example, the method further comprises manufacturing the 3D part with a CNC tool of the CNC machine. In this example or any other example, manufacturing the 3D part comprises moving the CNC tool of the CNC machine along the CNC toolpath to perform one or more of the following actions: form the 3D part from a sheet metal blank starting material via incremental sheet forming (ISF); print the 3D part from feedstock via additive manufacturing; machine the 3D part either from a starting billet of material or from the output of a previous manufacturing stage; polish the 3D part; finish the 3D part by means of spray painting, process the surface of the 3D part by means of shot peening or case hardening, perform metrology on the 3D part for quality assurance purposes. In this example or any other example, at least one transformed contour of the plurality of transformed contours is non-planar. In this example or any other example, the first topological space is a Euclidean space. In this example or any other example, the second topological space is a manifold space. In this example or any other example, the second topological space is a curved space. In this example or any other example, the CNC machine comprises a CNC tool having a tool surface and an offset reference point, and the offset surface defines a set of 3D points in the first topological space that, when coincident with the offset reference point of the CNC tool, correspond to contact between the tool surface of the CNC tool and a surface of the 3D part at a specified tooling depth. In this example or any other example, the CNC toolpath defines a set of movements for the CNC tool that, when performed, cause the offset reference point of the CNC tool to move between a given subset of the set of 3D points of the offset surface, while maintaining the tool surface of the CNC tool at positions contacting or external to the surface of the 3D part. In this example or any other example, computer-generating the CNC toolpath further comprises linking the plurality of transformed contours in a sequential order with transitional movements that maintain a tool surface of a CNC tool of the CNC machine at positions contacting or external to a surface of the 3D part. In this example or any other example, computer-generating the CNC toolpath further comprises adding a starting movement from a home position to a first transformed contour in the sequential order.

In an example, a computer numerical control (CNC) tool control system comprises: a CNC tool; a computer-controlled CNC tool movement assembly configured to manufacture a three-dimensional (3D) part by moving the CNC tool along a CNC toolpath; a logic subsystem; and a storage subsystem holding instructions executable by the logic machine to: read a digital model of the 3D part within a first topological space; generate an offset surface for the digital model in the first topological space; transform the offset surface in the first topological space to a transformed offset surface in a second topological space embedded in the first topological space; identify a plurality of contours at which a corresponding plurality of embedded parallel planes intersect the transformed offset surface in the second topological space; transform the plurality of contours in the second topological space into a corresponding plurality of transformed contours in the first topological space; and generate the CNC toolpath that traces each of the plurality of transformed contours in the first topological space, such that the CNC toolpath is useable by the CNC tool control system to manufacture the 3D part by controlling the computer-controlled CNC tool movement assembly to move the CNC tool along the CNC toolpath. In this example or any other example, the instructions are further executable to control the computer-controlled CNC tool movement assembly to move the CNC tool along the CNC toolpath and manufacture the 3D part. In this example or any other example, at least one transformed contour of the plurality of transformed contours is non-planar. In this example or any other example, the CNC tool comprises a tool surface and an offset reference point, and the offset surface defines a set of 3D points in the first topological space that, when coincident with the offset reference point of the CNC tool, correspond to contact between the tool surface of the CNC tool and a surface of the 3D part at a specified tooling depth.

In an example, a method for computer numerical control (CNC) manufacturing comprises: computer-reading a digital model of a three-dimensional (3D) part within a Euclidean space; computer-generating an offset surface for the digital model in the Euclidean space; computer-transforming the offset surface in the Euclidean space to a transformed offset surface in a manifold space embedded in the Euclidean space; computer-identifying a plurality of contours at which a corresponding plurality of embedded Z-level planes intersect the transformed offset surface in the manifold space; computer-transforming the plurality of contours in the manifold space into a corresponding plurality of transformed contours in the Euclidean space; computer-generating a CNC toolpath that traces each of the plurality of transformed contours in the Euclidean space; and computer-controlling a CNC tool to follow the CNC toolpath and manufacture the 3D part.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, the articles "a" and "an" as used in this application and the appended claims should generally be construed to mean "one or more" unless specified otherwise or clear from context to be directed to a singular form. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

The invention claimed is:

1. A method for computer numerical control (CNC) manufacturing, comprising:
    computer-reading a digital model of a three-dimensional (3D) part within a first topological space;
    computer-generating an offset surface for the digital model in the first topological space;
    computer-transforming the offset surface in the first topological space to a transformed offset surface in a second topological space embedded in the first topological space;
    computer-identifying a plurality of contours at which a corresponding plurality of embedded parallel planes intersect the transformed offset surface in the second topological space;
    computer-transforming the plurality of contours in the second topological space into a corresponding plurality of transformed contours in the first topological space; and
    computer-generating a CNC toolpath that traces each of the plurality of transformed contours in the first topological space, the CNC toolpath useable by a CNC machine to manufacture the 3D part.

2. The method of claim 1, further comprising manufacturing the 3D part with a CNC tool of the CNC machine.

3. The method of claim 2, wherein manufacturing the 3D part comprises moving the CNC tool of the CNC machine along the CNC toolpath to form the 3D part from a sheet metal blank starting material via incremental sheet forming (ISF).

4. The method of claim 2, wherein at least one step in manufacturing the 3D part comprises moving the CNC tool of the CNC machine along the CNC toolpath to print the 3D part from a starting material via 3D printing.

5. The method of claim 2, wherein at least one step in manufacturing the 3D part comprises moving the CNC tool of the CNC machine along the CNC toolpath to polish the 3D part.

6. The method of claim 2, wherein at least one step in manufacturing the 3D part comprises moving the CNC tool of the CNC machine along the CNC toolpath to machine the 3D part from a starting billet of material.

7. The method of claim 1, wherein at least one transformed contour of the plurality of transformed contours is non-planar.

8. The method of claim 1, wherein the first topological space is a Euclidean space.

9. The method of claim 1, wherein the second topological space is a manifold space.

10. The method of claim 1, wherein the second topological space is a curved space.

11. The method of claim 1, wherein the second topological space has a linear Z-axis, and the plurality of embedded parallel planes are Z-level planes perpendicular to the linear Z-axis.

12. The method of claim 1, wherein the CNC machine comprises a CNC tool having a tool surface and an offset reference point, and wherein the offset surface defines a set of 3D points in the first topological space that, when coincident with the offset reference point of the CNC tool, correspond to contact between the tool surface of the CNC tool and a surface of the 3D part at a specified tooling depth.

13. The method of claim 12, wherein the CNC toolpath defines a set of movements for the CNC tool that, when performed, cause the offset reference point of the CNC tool to move between a given subset of the set of 3D points of the offset surface, while maintaining the tool surface of the CNC tool at positions contacting or external to the surface of the 3D part.

14. The method of claim 1, wherein computer-generating the CNC toolpath further comprises linking the plurality of transformed contours in a sequential order with transitional movements that maintain a tool surface of a CNC tool of the CNC machine at positions contacting or external to a surface of the 3D part.

15. The method of claim 14, wherein computer-generating the CNC toolpath further comprises adding a starting movement from a home position to a first transformed contour in the sequential order.

16. A computer numerical control (CNC) tool control system, comprising:
    a CNC tool;
    a computer-controlled CNC tool movement assembly configured to manufacture a three-dimensional (3D) part by moving the CNC tool along a CNC toolpath;
    a logic subsystem; and
    a storage subsystem holding instructions executable by the logic subsystem to:
        read a digital model of the 3D part within a first topological space;
        generate an offset surface for the digital model in the first topological space;
        transform the offset surface in the first topological space to a transformed offset surface in a second topological space embedded in the first topological space;
        identify a plurality of contours at which a corresponding plurality of embedded parallel planes intersect the transformed offset surface in the second topological space;
        transform the plurality of contours in the second topological space into a corresponding plurality of transformed contours in the first topological space; and
        generate the CNC toolpath that traces each of the plurality of transformed contours in the first topological space, such that the CNC toolpath is useable by the CNC tool control system to manufacture the 3D part by controlling the computer-controlled CNC tool movement assembly to move the CNC tool along the CNC toolpath.

17. The CNC tool control system of claim 16, wherein the instructions are further executable to control the computer-controlled CNC tool movement assembly to move the CNC tool along the CNC toolpath and manufacture the 3D part.

18. The CNC tool control system of claim 16, wherein the CNC tool comprises a tool surface and an offset reference point, and wherein the offset surface defines a set of 3D points in the first topological space that, when coincident with the offset reference point of the CNC tool, correspond to contact between the tool surface of the CNC tool and a surface of the 3D part at a specified tooling depth.

19. A method for computer numerical control (CNC) manufacturing, comprising:
    computer-reading a digital model of a three-dimensional (3D) part within a Euclidean space;
    computer-generating an offset surface for the digital model in the Euclidean space;
    computer-transforming the offset surface in the Euclidean space to a transformed offset surface in a manifold space embedded in the Euclidean space;
    computer-identifying a plurality of contours at which a corresponding plurality of embedded Z-level planes intersect the transformed offset surface in the manifold space;
    computer-transforming the plurality of contours in the manifold space into a corresponding plurality of transformed contours in the Euclidean space;
    computer-generating a CNC toolpath that traces each of the plurality of transformed contours in the Euclidean space; and
    computer-controlling a CNC tool to follow the CNC toolpath and manufacture the 3D part.

20. The method of claim 19, wherein the CNC tool has a tool surface and an offset reference point, and wherein the offset surface defines a set of 3D points in the Euclidean space that, when coincident with the offset reference point of the CNC tool, correspond to contact between the tool surface of the CNC tool and a surface of the 3D part at a specified tooling depth.

* * * * *